United States Patent
Abrahami

(10) Patent No.: US 10,185,703 B2
(45) Date of Patent: Jan. 22, 2019

(54) WEB SITE DESIGN SYSTEM INTEGRATING DYNAMIC LAYOUT AND DYNAMIC CONTENT

(71) Applicant: Wix.Com Ltd., Tel Aviv (IL)

(72) Inventor: Nadav Abrahami, Tel Aviv (IL)

(73) Assignee: Wix.com Ltd., Tel Aviv (IL)

( * ) Notice: Subject to any disclaimer, the term of this patent is extended or adjusted under 35 U.S.C. 154(b) by 334 days.

(21) Appl. No.: 13/771,119

(22) Filed: Feb. 20, 2013

(65) Prior Publication Data

US 2013/0219263 A1     Aug. 22, 2013

Related U.S. Application Data

(60) Provisional application No. 61/600,726, filed on Feb. 20, 2012.

(51) Int. Cl.
| | |
|---|---|
| *G06F 17/00* | (2006.01) |
| *G06F 17/21* | (2006.01) |
| *G06F 17/22* | (2006.01) |
| *G06F 17/30* | (2006.01) |

(52) U.S. Cl.
CPC .......... *G06F 17/218* (2013.01); *G06F 17/211* (2013.01); *G06F 17/2247* (2013.01); *G06F 17/30905* (2013.01)

(58) Field of Classification Search
CPC .......... G06F 17/2247; G06F 17/30893; G06F 17/30905; G06F 17/218; G06F 17/211
USPC ................................. 715/201, 209, 234, 788
See application file for complete search history.

(56) References Cited

U.S. PATENT DOCUMENTS

| | | | | |
|---|---|---|---|---|
| 5,721,848 A * | 2/1998 | Joseph | ................. | G06F 9/4443 |
| | | | | 715/764 |
| 5,796,401 A * | 8/1998 | Winer | .......................... | 345/619 |
| 6,144,991 A * | 11/2000 | England | ....................... | 709/205 |
| 7,222,306 B2 * | 5/2007 | Kaasila et al. | ................ | 715/801 |
| 7,533,142 B2 * | 5/2009 | Ng et al. | ....................... | 709/202 |
| 7,554,689 B2 * | 6/2009 | Tonisson | ...................... | 358/1.18 |
| 7,568,155 B1 * | 7/2009 | Axe et al. | ...................... | 715/246 |
| 7,634,725 B2 * | 12/2009 | Nishikawa | ............. | G06K 15/02 |
| | | | | 715/243 |
| 7,812,786 B2 * | 10/2010 | Etelapera | ............... | G06F 3/1438 |
| | | | | 345/3.3 |
| 7,856,345 B2 * | 12/2010 | Christensen et al. | ............. | 703/4 |
| 7,992,007 B2 * | 8/2011 | Lazzaro | ............ | G06Q 30/0641 |
| | | | | 713/183 |

(Continued)

OTHER PUBLICATIONS

Masato Nakamura, A Dynamic Rearrangement Mechanism of Web Page Layouts Using Web Agents, 2009, Dept. of Computer Science and Engineering, Graduate School of Engineering, Nagoya Institute of Technology, Gokiso-cho, Showa-ku, Nagoya, Aichi, 466-8555 Japan, all pages.*

*Primary Examiner* — Scott T Baderman
*Assistant Examiner* — Hassan Mrabi
(74) *Attorney, Agent, or Firm* — Heidi Brun Associates Ltd.

(57) ABSTRACT

A system for implementing dynamic layout on a website. The system includes a receiver on a server to receive events caused by dynamic layout triggers from at least one client and a coordinator on the server to coordinate dynamic layout updates between the server and the at least one client according to the events and associated dynamic layout rules stored on the server.

38 Claims, 35 Drawing Sheets

(56) References Cited

U.S. PATENT DOCUMENTS

| | | | |
|---|---|---|---|
| 8,112,502 B2 * | 2/2012 | Emmelmann | G06F 8/315 709/217 |
| 8,312,170 B2 * | 11/2012 | Ng et al. | 709/246 |
| 8,489,984 B1 * | 7/2013 | Violet | G06F 8/34 715/209 |
| 8,694,900 B2 * | 4/2014 | Bishop | G06F 9/4443 715/763 |
| 8,862,991 B2 * | 10/2014 | Harrington et al. | 715/277 |
| 9,043,698 B2 * | 5/2015 | Tucovic | G06F 17/24 715/246 |
| 2004/0078776 A1 * | 4/2004 | Moon et al. | 717/101 |
| 2005/0071755 A1 * | 3/2005 | Harrington et al. | 715/511 |
| 2005/0198204 A1 * | 9/2005 | Takahashi | 709/219 |
| 2006/0044604 A1 * | 3/2006 | Mirmotahari | 358/1.15 |
| 2006/0103667 A1 * | 5/2006 | Amit et al. | 345/619 |
| 2006/0143182 A1 * | 6/2006 | Meadows | 707/10 |
| 2006/0190811 A1 * | 8/2006 | Ohno | 715/507 |
| 2006/0198555 A1 * | 9/2006 | Hosotsubo | 382/162 |
| 2006/0212805 A1 * | 9/2006 | Allen et al. | 715/520 |
| 2006/0236231 A1 * | 10/2006 | Allen et al. | 715/517 |
| 2006/0259860 A1 * | 11/2006 | Kobashi | 715/521 |
| 2007/0028166 A1 * | 2/2007 | Hundhausen et al. | 715/530 |
| 2007/0171716 A1 * | 7/2007 | Wright et al. | 365/185.12 |
| 2008/0155387 A1 * | 6/2008 | Yabe | 715/204 |
| 2008/0209533 A1 * | 8/2008 | Abrams et al. | 726/9 |
| 2008/0215964 A1 * | 9/2008 | Abrams et al. | 715/246 |
| 2008/0215965 A1 * | 9/2008 | Abrams et al. | 715/246 |
| 2008/0215967 A1 * | 9/2008 | Abrams et al. | 715/255 |
| 2008/0215985 A1 * | 9/2008 | Batchelder et al. | 715/731 |
| 2008/0313533 A1 * | 12/2008 | Hoyer et al. | 715/243 |
| 2009/0100129 A1 * | 4/2009 | Vigil et al. | 709/203 |
| 2009/0309894 A1 * | 12/2009 | Lam et al. | 345/582 |
| 2011/0213655 A1 * | 9/2011 | Henkin et al. | 705/14.49 |
| 2012/0036423 A1 * | 2/2012 | Haynes et al. | 715/230 |
| 2012/0226971 A1 * | 9/2012 | Tocchini et al. | 715/234 |
| 2013/0212487 A1 * | 8/2013 | Cote | G06F 3/048 715/745 |
| 2013/0227617 A1 * | 8/2013 | Carney et al. | 725/61 |
| 2013/0263280 A1 * | 10/2013 | Cote | 726/26 |
| 2014/0250371 A1 * | 9/2014 | Wabyick et al. | 715/243 |

* cited by examiner

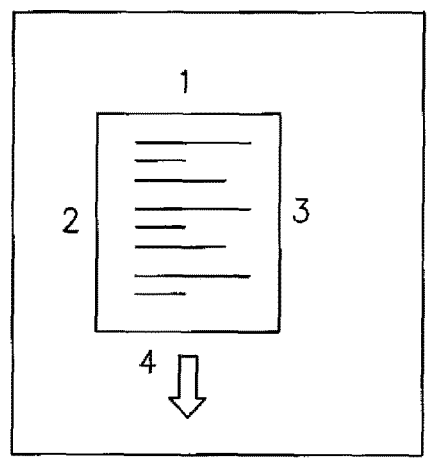
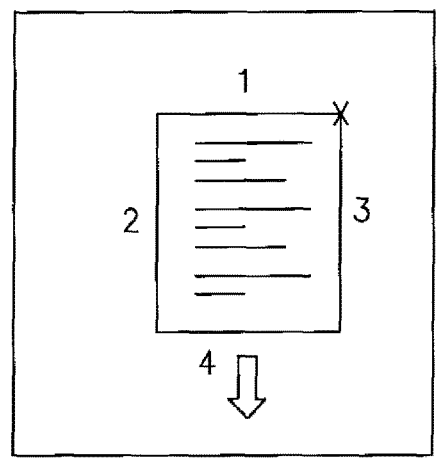
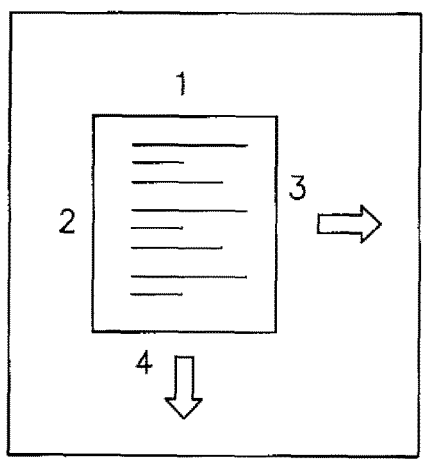
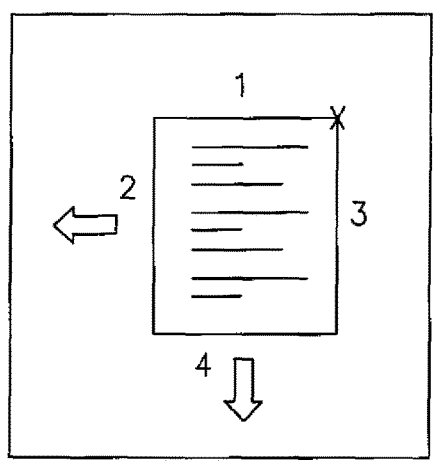
FIG.14C  FIG.14D

WEB SITE DESIGN SYSTEM INTEGRATING DYNAMIC LAYOUT AND DYNAMIC CONTENT

CROSS-REFERENCE TO RELATED APPLICATIONS

This application claims priority from U.S. Provisional Patent Application No. 61/600,726 filed Feb. 20, 2012 which is hereby incorporated in its entirety by reference.

FIELD OF THE INVENTION

The present invention relates to the building of online visual design systems generally and to dynamic layout in particular.

BACKGROUND OF THE INVENTION

Current visual design systems use a WYSIWYG (What You See Is What You Get) metaphor to provide a convenient, high-productivity and easy to use environment for the creation and editing of graphical applications and creations. Such creations or applications can include web sites, catalogs, presentations, e-shops, flow diagrams and as well as other application categories. These creations are deployed to systems which display them on a display screen, or to systems which print them.

A visual design system may integrate both static and dynamic content into the applications created in it. Static content may be stored locally and dynamic content may originate from a number of sources such as from the application itself, a database, an external dynamic data sources (or streams) such as a RSS feed or content generated by other users of the same system.

Visual design systems may be standalone systems (such as the Microsoft Visio diagram editor or the Microsoft PowerPoint presentation program), or may be embedded inside a larger editing system (such as the Microsoft Word AutoShape editor).

A designer using such a system may design a new application from scratch (starting with a blank screen), or may rely on predefined templates created by the application designer, by the system creator, or by the designer community. When a template is provided, the designer can customize it at will, adding, removing or modifying all elements of the template to create his or her version of the template.

Such applications generally consist of multiple pages. An application can include any number of pages and pages can typically be added or removed by the system designer and/or the end-user as required. Pages contain components which can be further classified as either atomic (those that cannot be broken down into sub-components) or container (which occupy a given screen area and can contain one or more further sub-components). Components may be fixed in shape and content, may be based on a content management system or may be based on user specified content such as a text area into which the designer enters text. Dynamic components can be based on external information (static or dynamic), such as a RSS feed displaying information from an external data source or the content of a given internet page.

Container components can be nested to a number of levels and can contain components of multiple types. Some containers are also limited to contain specific classes of contained components such as a photo album container which may only hold picture components. Component appearances and screen areas can be modified by moving, resizing, rotation and similar operations. Their appearance and behavior can also be modified by various modifiers, such as blurring and animation (e.g. the component has blurred edges, or appears on the screen by expanding from a single pixel, etc.) During the application creation and editing process, the content of a component may be entered and modified in a number of ways.

In visual design systems, typically the pages (containing the components) as well as the components themselves (container and atomic components) are often rectangles whose sides are parallel to each other and to the sides of the display screen. They are also parallel to the X and Y axes of the system on which the pages are being displayed or printed. In some cases, the components themselves are not axes-parallel rectangles. They may be a rotated rectangle, a combination of attached rectangles, or have a different shape altogether. In these cases, visual design systems (and their layout management element) typically handle the components using a per-component minimal enclosing axes-parallel rectangle which contains the irregularly-shaped component.

Components do not have to occupy mutually exclusive screen regions, and may in fact geometrically intersect each other. A component may also be situated completely within the boundaries of another component. The screen area overlap may be coupled with logical containment (i.e. the component "belongs" to a given container—and moves with the container wherever it goes), or be a mere geometrical overlap which is not based on any containment relationship. Whenever components intersect, a display priority attached to each component controls which component is displayed on top of which component. A visual design system typically employs a layout manager which manages component places, sizes, display order and related issues.

Visual design systems can be often be classified as absolute position or relative position systems (described in more detail herein below). In absolute positioning systems, the focus is on exact component positioning. The location of the components is defined as an absolute position value (x, y) relative to the containing entity, be it relative to the page itself or to a container containing the component. The position is typically expressed as an offset between the top left corner of the containing entity and the top left corner of the component.

In relative positioning systems, the focus is on the concept of flow or natural order. The system arranges components along a logical content flow, which typically corresponds to the reading order of the components whenever such an order is applicable. For example, an English language word processor is essentially a layout system for characters (and words) which uses the natural reading order of the English language (top to bottom and then left to right) to arrange the displayed characters and words. Another example is a blog editing system (such as the Wordpress blogging platform commercially available from wordpress.org), which arranges page elements (blog entries, talkbacks etc.) on a page according to a natural reading flow.

Thus, in a relative positioning system, the components are positioned relative to each other, so a component is displayed after (position-wise) the display of a previous component ends. Existing absolute and relative positioning systems both define a default screen or page size, which is used for all displayed pages. All relative positioning systems (and some absolute positioning systems) can increase this size as required to accommodate the addition of content to the page.

Visual design systems which use absolute positioning are best suited for exact layout and design of the displayed page. Such exact placement allows components to be properly sized, positioned and aligned on the displayed screen. For example, as illustrated in FIG. 1 components [a], [b], [c] and [d] are arranged on a page P. Components [e] and [f] are then added in the available space (page Q), so that all are properly aligned—[a], [e] and [c] in the first row, and [b], [f] and [d] in the second row—without the need to push components aside or to calculate the correct reading flow.

There are also two main types of absolute positioning systems, constraint based systems and anchor-based systems. The types are not mutually exclusive and systems can contain elements of both systems. In visual design systems, constraints and anchors can be specified explicitly by the designer (through the system user interface) or inferred automatically by the system based on existing component layout and information. In a constraint-based system, the designer defines dynamic mathematical constraints on the relationships between the components residing on the screen. In anchor-based systems, the dynamic layout is defined in terms of anchors set between components and framework elements, as well as between the components themselves.

Dynamic layout, the automatic adjustment of components according to their content to fit on a page, is known in the art. In existing systems, dynamic layout is typically present in relative (rather than absolute) positioning systems. Current methods available provide both manual and automatic solutions using standard methodologies such as anchoring. Dynamic layout involves the moving and resizing of components on the screen based on dynamic layout triggers. These triggers may include content changes, multiple target platforms (display of the application using different technologies on different viewing platforms), multiple screen sizes (display of the application using a number of displays which have different sizes and resolutions), dynamic data (use of components containing dynamic data which changes over time), end user changes and application initiated layout changes. Component moving and resizing may also cause dynamic layout changes (i.e. act as a trigger), although the system should provide a way to move and resize component without triggering dynamic layout (e.g. by providing separate visual editing modes with and without dynamic layout triggering).

Reference is now made to FIG. 2 which illustrates the implementation of dynamic layout on components [a] and [b] situated on a page W. As can be seen, component [a] is placed slightly above component [b] with a small separation between them. During editing, when component A is moved down, it begins to overlap and occlude component [b] as seen on page X. In such a scenario, it would be desirable to also move component [b] accordingly in order to view the content of component [b] as is shown on page Y or to even resize it accordingly, as shown on page Z, without losing sight of the content of component [b]. Such changes include not only modifications to the content of the displayed components ([a], [b]) but also modifications to their style and other display parameters, such as text size and font.

U.S. Pat. No. 5,796,401 to Wiener together with U.S. Pat. No. 7,554,689 to Tonisson and U.S. Pat. No. 7,634,725 to Nishikawa are believed to be representative of the prior art regarding dynamic layout.

SUMMARY OF THE PRESENT INVENTION

There is provided in accordance with a preferred embodiment of the present invention, a system for implementing dynamic layout on a website. The system includes a receiver on a server to receive events caused by dynamic layout triggers from at least one client and a coordinator on the server to coordinate dynamic layout updates between the server and the at least one client according to the events and associated dynamic layout rules stored on the server.

Moreover, in accordance with a preferred embodiment of the present invention, the system also includes a database to store elements of the website, the associated rules and dynamic layout information.

Further, in accordance with a preferred embodiment of the present invention, the coordinator includes a pre-processor to preprocess for specific targets and un-displayed areas.

Still further, in accordance with a preferred embodiment of the present invention, the coordinator includes a dynamic data aggregator to aggregate and limit dynamic data.

Additionally, in accordance with a preferred embodiment of the present invention, the rules define the relationships between the web site elements and at least one other secondary website element.

Moreover, in accordance with a preferred embodiment of the present invention, the relationships are at least one of: explicit anchors, automatic anchors, semi-automatic anchors and gate conditions.

Further, in accordance with a preferred embodiment of the present invention, the anchors define the relationships between the website elements and their content.

Still further, in accordance with a preferred embodiment of the present invention, the anchors define the relationships_between the parallel edges of adjacent website elements along a primary direction.

Additionally, in accordance with a preferred embodiment of the present invention, the anchors define the relationships between the edges of the website elements with the matching edge of a secondary website element.

Moreover, in accordance with a preferred embodiment of the present invention, the information includes at least one of: the anchor information, the anchor creation history, the original position and size of the elements and designer and end-user parameters.

Further, in accordance with a preferred embodiment of the present invention, the updates include the manipulation of the website elements according to the event and the associated rules.

Still further, in accordance with a preferred embodiment of the present invention, the website elements are at least one of a component and a framework.

Additionally, in accordance with a preferred embodiment of the present invention, the at least one client is at least one of an editor client and a viewer client.

Moreover, in accordance with a preferred embodiment of the present invention, the triggers include at least one of component size and position changes, content changes, content formatting change, components having multiple configurations, multiple target platforms, multiple screen sizes, dynamic data, end user changes and application initiated layout changes.

Further, in accordance with a preferred embodiment of the present invention, the rules are at least one of: user defined and system defined.

Still further, in accordance with a preferred embodiment of the present invention, the website is viewable via at least one of: a regular browser, a specialized web browser and a non-browser client access application.

There is provided in accordance with a preferred embodiment of the present invention, a system for implementing dynamic layout on a shared website. The system includes a receiver on a server to receive events caused by dynamic layout triggers from at least two clients editing the shared website and a database communicating with the server to store elements of the shared website, rules and dynamic layout information associated with the events.

Moreover, in accordance with a preferred embodiment of the present invention, the rules define the relationships between web site elements and at least one other secondary web site element.

Further, in accordance with a preferred embodiment of the present invention, the relationships are at least one of explicit anchors, automatic anchors, semi-automatic anchors and gate conditions.

Still further, in accordance with a preferred embodiment of the present invention, the anchors define the relationships between the website elements and their content.

Additionally, in accordance with a preferred embodiment of the present invention, the anchors define the relationships_between parallel edges of adjacent website elements along a primary direction.

Moreover, in accordance with a preferred embodiment of the present invention, the anchors define the relationships between the edges of the website elements with the matching edge of a secondary website element.

Further, in accordance with a preferred embodiment of the present invention, the information includes at least one of: the anchor information, the anchor creation history, the original position and size of the elements and designer and end-user parameters.

Still further, in accordance with a preferred embodiment of the present invention, the website elements are at least one of a component and a framework.

Additionally, in accordance with a preferred embodiment of the present invention, the triggers include at least one of component size and position changes, content changes, content formatting change, components having multiple configurations, multiple target platforms, multiple screen sizes, dynamic data, end user changes and application initiated layout changes.

Moreover, in accordance with a preferred embodiment of the present invention, the least two clients are at least one of an editor client and a viewer client.

Further, in accordance with a preferred embodiment of the present invention, the rules are at least one of: user defined and system defined.

Additionally, in accordance with a preferred embodiment of the present invention, the shared website is viewable via at least one of: a regular browser, a specialized web browser and a non-browser client access application.

There is provided in accordance with a preferred embodiment of the present invention, a system for implementing dynamic layout on a website. The system includes a coordinator on a client to receive events caused by dynamic layout triggers on the client. The system also includes an updater on the client communicating with a database implemented on a server, with the database storing elements of the website, rules and dynamic layout information associated with the events in order to update the elements, according to the events and associated rules.

Moreover, in accordance with a preferred embodiment of the present invention, the coordinator includes a pre-processor to preprocess for specific targets and un-displayed areas.

Further, in accordance with a preferred embodiment of the present invention, the coordinator comprises a dynamic data aggregator to aggregate and limit dynamic data.

Still further, in accordance with a preferred embodiment of the present invention, the rules define the relationships between the web site elements and at least one other secondary website element.

Additionally, in accordance with a preferred embodiment of the present invention, the relationships are at least one of: explicit anchors, automatic anchors, semi-automatic anchors and gate conditions.

Moreover, in accordance with a preferred embodiment of the present invention, the anchors define the relationships between the website elements and their content.

Further, in accordance with a preferred embodiment of the present invention, the anchors define the relationships_between parallel edges of adjacent website elements along a primary direction.

Still further, in accordance with a preferred embodiment of the present invention, the anchors define the relationships between the edges of the website elements with the matching edge of a secondary website element.

Additionally, in accordance with a preferred embodiment of the present invention, the information includes at least one of: the anchor information, the anchor creation history, the original position and size of the elements and designer and end-user parameters.

Moreover, in accordance with a preferred embodiment of the present invention, the updates include the manipulation of the website elements according to the event and the associated rules.

Further, in accordance with a preferred embodiment of the present invention, the website elements are at least one of a component and a framework.

Still further, in accordance with a preferred embodiment of the present invention, the client is at least one of an editor client and a viewer client.

Additionally, in accordance with a preferred embodiment of the present invention, the triggers include at least one of component size and position changes, content changes, content formatting change, components having multiple configurations, multiple target platforms, multiple screen sizes, dynamic data, end user changes and application initiated layout changes.

Moreover, in accordance with a preferred embodiment of the present invention, the rules are at least one of: user defined and system defined.

Further, in accordance with a preferred embodiment of the present invention, the website is viewable via at least one of: a regular browser, a specialized web browser and a non-browser client access application.

There is provided in accordance with a preferred embodiment of the present invention, a method for implementing dynamic layout on a website. The method includes: receiving events caused by dynamic layout triggers from at least one client and coordinating dynamic layout updates between a server and the at least one client according to the events and associated dynamic layout rules stored on the server.

Moreover, in accordance with a preferred embodiment of the present invention, the method also includes a database to store elements of the website, the associated rules and dynamic layout information.

Further, in accordance with a preferred embodiment of the present invention, the coordinating includes preprocessing specific targets and un-displayed areas.

Still further, in accordance with a preferred embodiment of the present invention, the coordinating includes aggregating dynamic data and limiting dynamic data.

Additionally, in accordance with a preferred embodiment of the present invention, the rules define the relationships between the web site elements and at least one other secondary website element.

Moreover, in accordance with a preferred embodiment of the present invention, the relationships are at least one of: explicit anchors, automatic anchors, semi-automatic anchors and gate conditions.

Further, in accordance with a preferred embodiment of the present invention, the anchors define the relationships between the website elements and their content.

Still further, in accordance with a preferred embodiment of the present invention, the anchors define the relationships_between parallel edges of adjacent website elements along a primary direction.

Additionally, in accordance with a preferred embodiment of the present invention, the anchors define the relationships between the edges of the website elements with the matching edge of a secondary website element.

Moreover, in accordance with a preferred embodiment of the present invention, the information includes at least one of: the anchor information, the anchor creation history, the original position and size of the elements and designer and end-user parameters.

Further, in accordance with a preferred embodiment of the present invention, the method also includes manipulating the website elements according to the events and the associated rules.

Still further, in accordance with a preferred embodiment of the present invention, the website elements are at least one of a component and a framework.

Additionally, in accordance with a preferred embodiment of the present invention, the at least one client is at least one of an editor client and a viewer client.

Moreover, in accordance with a preferred embodiment of the present invention, the triggers include at least one of component size and position changes, content changes, content formatting change, components having multiple configurations, multiple target platforms, multiple screen sizes, dynamic data, end user changes and application initiated layout changes.

Further, in accordance with a preferred embodiment of the present invention, the rules are at least one of: user defined and system defined.

Still further, in accordance with a preferred embodiment of the present invention, the website is viewable via at least one of: a regular browser, a specialized web browser and a non-browser client access application.

There is provided in accordance with a preferred embodiment of the present invention, a method for implementing dynamic layout on a shared website. The method includes receiving events caused by dynamic layout triggers from at least two clients editing the shared website and communicating with a database implemented on the server. The database stores elements of the shared website, rules and dynamic layout information associated with the events.

Further, in accordance with a preferred embodiment of the present invention, the rules define the relationships between web site elements and at least one other secondary web site element.

Still further, in accordance with a preferred embodiment of the present invention, the relationships are at least one of: explicit anchors, automatic anchors, semi-automatic anchors and gate conditions.

Additionally, in accordance with a preferred embodiment of the present invention, the anchors define the relationships between the website elements and their content.

Moreover, in accordance with a preferred embodiment of the present invention, the anchors define the relationships_between parallel edges of adjacent website elements along a primary direction.

Further, in accordance with a preferred embodiment of the present invention, the anchors define the relationships between the edges of the website elements with the matching edge of a secondary website element.

Still further, in accordance with a preferred embodiment of the present invention, the information comprises at least one of: the anchor information, the anchor creation history, the original position and size of said elements and designer and end-user parameters.

Additionally, in accordance with a preferred embodiment of the present invention, the website elements are at least one of a component and a framework.

Further, in accordance with a preferred embodiment of the present invention, the triggers include at least one of component size and position changes, content changes, content formatting change, components having multiple configurations, multiple target platforms, multiple screen sizes, dynamic data, end user changes and application initiated layout changes.

Still further, in accordance with a preferred embodiment of the present invention, the at least two clients are at least one of an editor client and a viewer client.

Additionally, in accordance with a preferred embodiment of the present invention, the rules are at least one of: user defined and system defined.

Moreover, in accordance with a preferred embodiment of the present invention, the shared website is viewable via at least one of: a regular browser, a specialized web browser and a non-browser client access application.

There is provided in accordance with a preferred embodiment of the present invention, the method includes anchoring the edge of a website element with the matching edge of a secondary website element.

Moreover, in accordance with a preferred embodiment of the present invention, the edge is at least one of a top edge and bottom edge.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIGS. 14A, 14B, 14C and 14D are schematic illustrations of component center locking, constructed and operative in accordance with the present invention;

Figure 1:
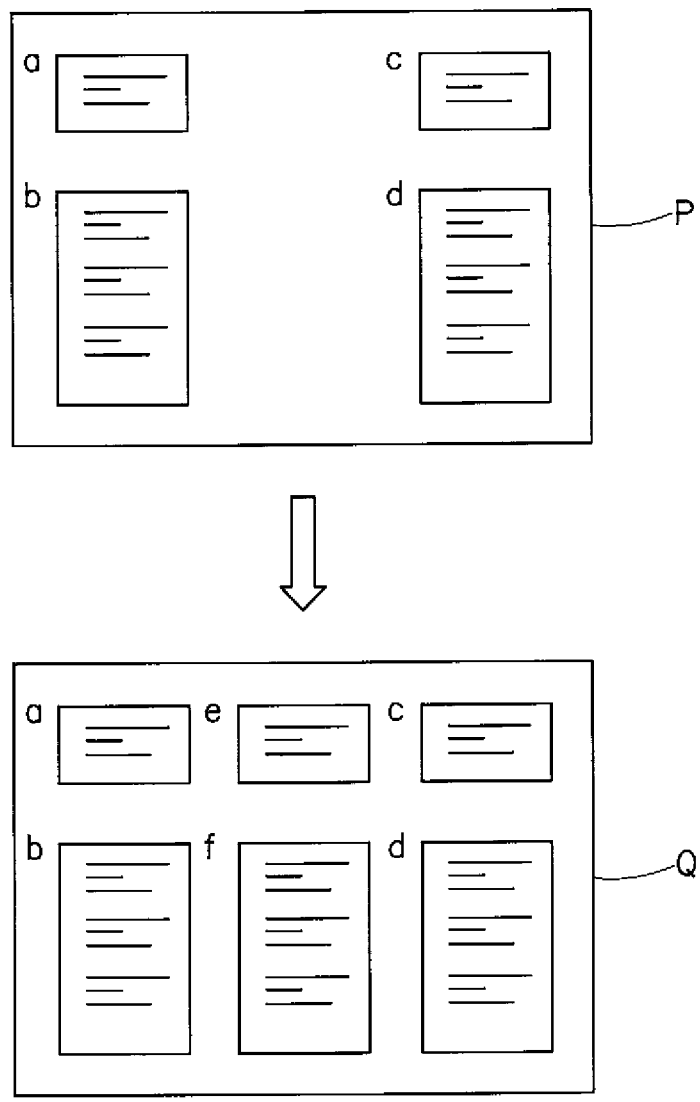
FIG. 1 is a schematic illustration of the use of absolute positioning in web page design.
Figure 2:
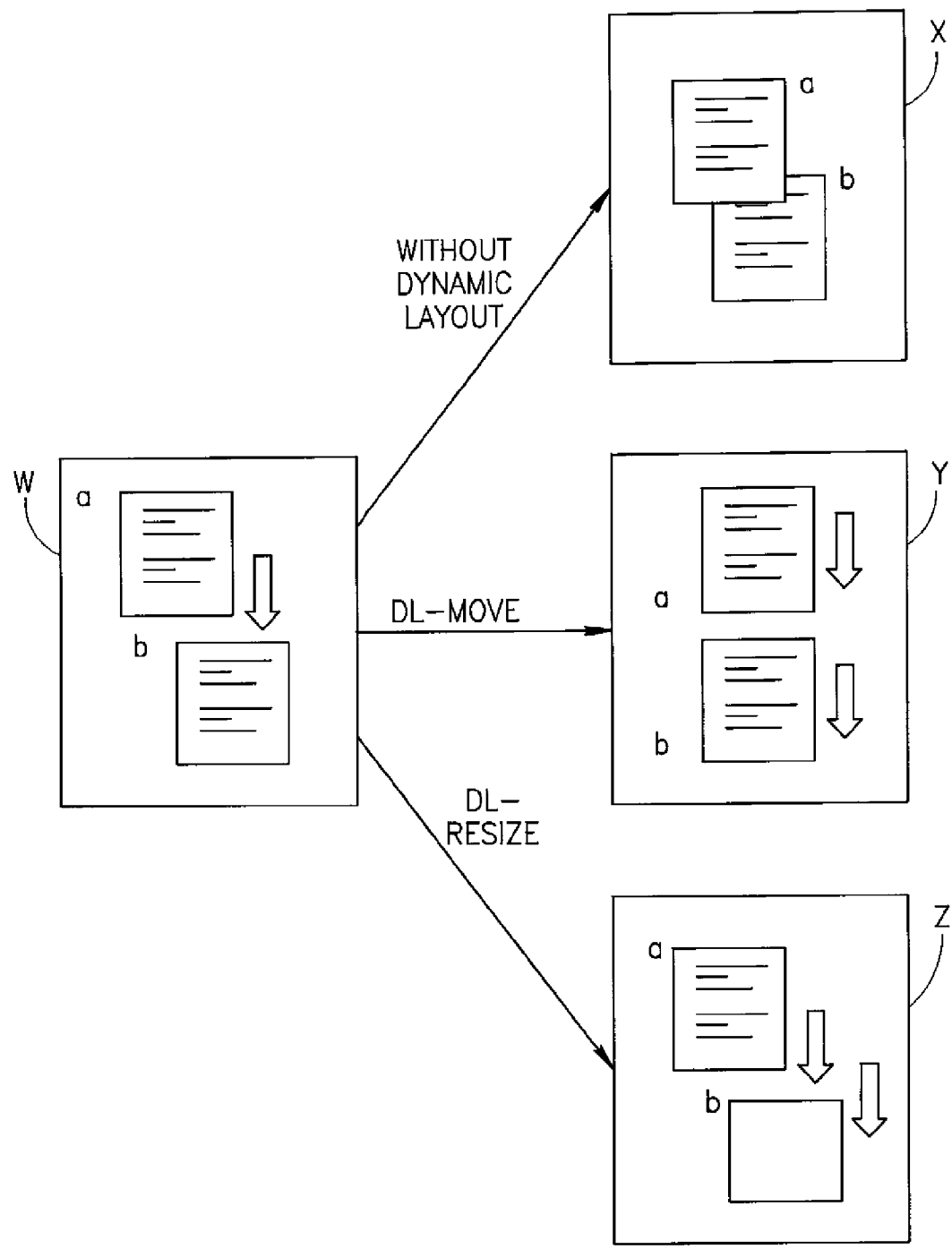
FIG. 2 is a schematic illustration of the use of dynamic layout during online editing.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Figure 3:
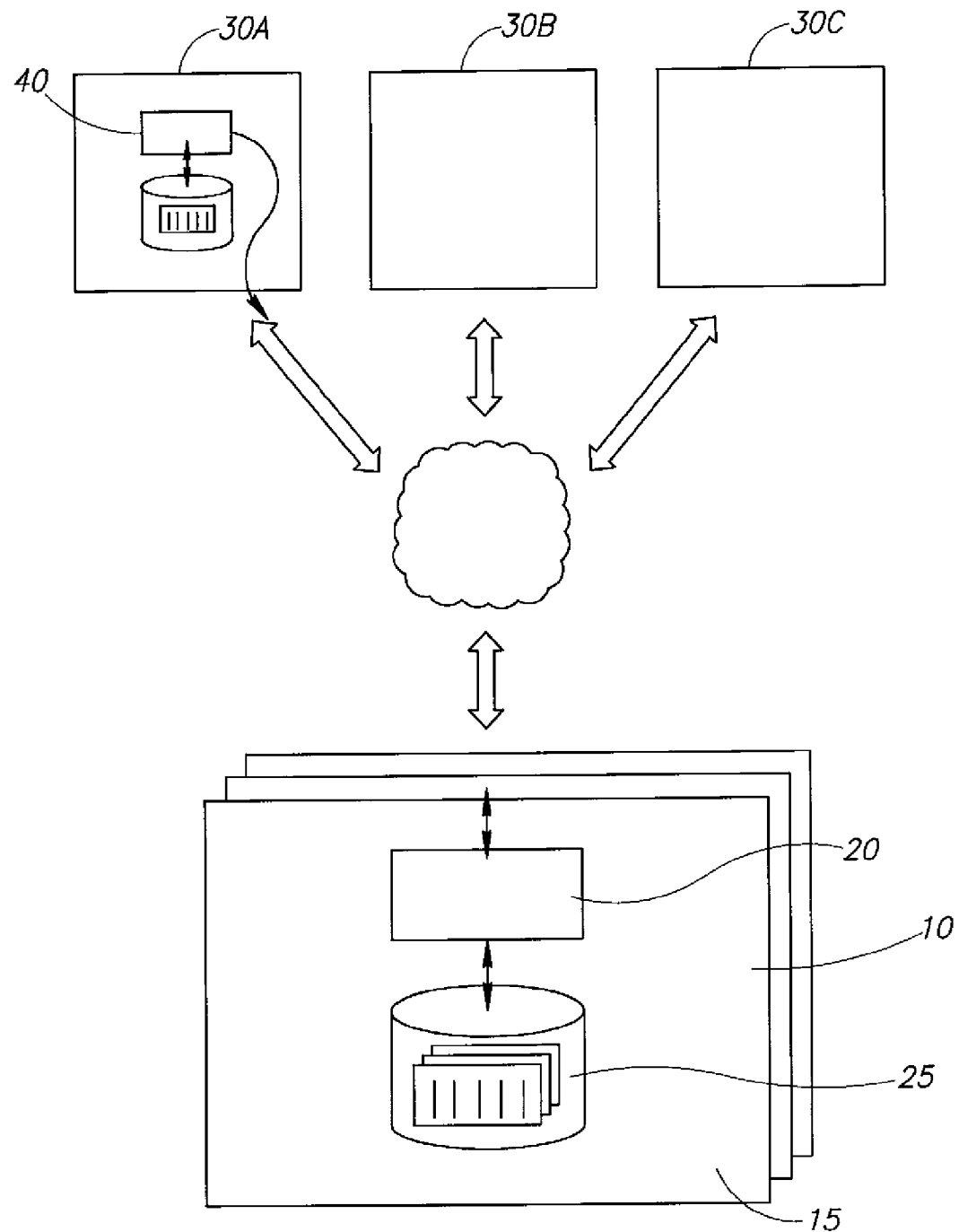
FIG. 3 is a schematic illustration of the architecture and elements of a server-based website design system.

Many of the types of visual design systems as discussed in the background are aimed specifically at the design and editing of websites. Websites are typically hosted by a remote server and accessed locally on a client integrated with a browser for access to the layout and content residing on the remote server. Reference is now made to FIG. 3 which illustrates a website server 10 hosting application 20 and content 25 and which is servicing client 30. Application 20 may be viewed using by client 30A using a browser 40. It will be appreciated that website server 10 may be typically accessed by multiple clients (30B, 30C) at any one time allowing for multiple users to view the same website concurrently.

It will also be appreciated, that in existing systems known in the art, the functionality related to dynamic layout is performed entirely on the editing or viewing software client 30, without involving the capabilities provided by a centralized application-specific server which supports the dynamic layout process. In existing systems, a copy of the website in question may often be held locally for editing. Changes made to a website are stored locally and then later synchronized with the main copy of the website which is stored on website server 10. Such synchronization may occur whenever the designer moves from page to page, on explicit designer requests, over a given time period or using another mechanism.

Applicants have realized that current methods of working with dynamic layout are limiting. There are two solutions that are in common use in absolute-positioning systems for the problems arising when there is insufficient space to display the required content. One common solution is dynamically adding scroll bars (e.g. HTML IFRAME or DIV "scrolling=auto" property) to the component so to enable the application user to scroll over the content (be it text or image). Another common solution is dynamically changing the text font size to fit into the available space (such as. Microsoft Excel's "alignment|shrink to fit" option). It will be appreciated that scroll bars require the application user to scroll to read the full text, or view the full media and that this is particularly bothering to users when there is only a small amount of text which doesn't fit into the allocated space; Horizontal scroll bars may be especially problematic as they require text to be scrolled twice for every line read, and not just when finishing reading the page (as vertical scroll bars do). A similar problem exists with vertical scroll bars applied to components displaying vertical text such as Japanese and Chinese traditional text writing. Scroll bars also cannot be used in print media output, or in situations in which user interaction is limited (such as applications displayed on a data kiosk). Text font resizing is often unacceptable as the text would have to shrink to a size below what is reasonable for a user to view.

As described herein above, dynamic layout, when used in absolute positioning systems, involves the moving and resizing of components on the screen based on dynamic layout triggers. Some examples known in the art for absolute positioning systems which also comprise dynamic layout include: the use of absolute alignment in HTML CSS (with 4 directional margin specification) and the use of anchoring and docking the controls in a graphical user interface (GUI) design for systems running under the Microsoft Windows operating system. Anchoring (described in more detail herein below) entails connecting the edge of a GUI component to the edge of a container, causing the component to be resized or moved when the container changes. Docking entails specifying that multiple GUI components are stacked (based on predefined priority) near a given edge of a container. These options can be found, for example, in the Microsoft dynamic layout controls and in the Telerik dynamic reports system commercially available from Telerik.

Applicants have realized that these simple dynamic layout solutions and systems cannot create complex, high quality web sites (such as e-Commerce store fronts) that integrate multiple dynamic content and dynamic layouts. There are often cases in which components have to be moved or re-sized making it difficult to maintain the preplanned exact layout. This layout can become unstable and incorrect. This is especially relevant when the content is external to the system, and reflects for example, an external product database which is not managed by the design system itself. Dynamic layout is also a necessity for devices such as smart phones and tablets that have smaller display areas than a regular personal computer. Applicants have further realized that the use of a centralized application-specific server combined with dynamic layout principles may allow for concurrent editing of the same website by multiple users on multiple clients, may allow for the integration of dynamic content from multiple sources and may also allow automatic real time modifications due to dynamic data and screen size changes.

Figure 4A:
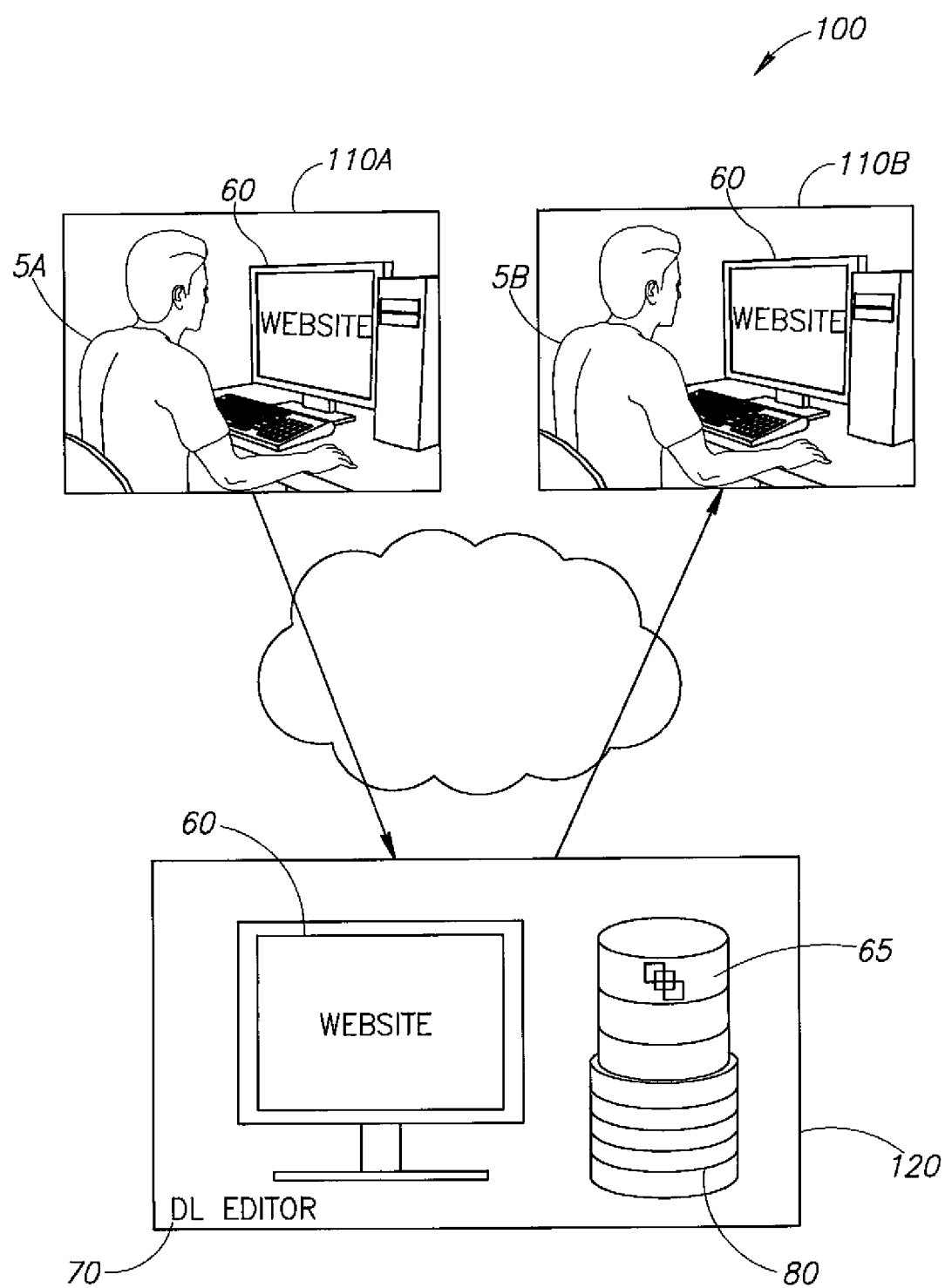
FIG. 4A is a schematic illustration of a centralized application-specific server system for the design and layout of a website implementing dynamic layout techniques, constructed and operative in accordance with the present invention.

Reference is now made to FIG. 4A which illustrates a centralized application-specific server system 100 for the design and layout of a website 60 implementing dynamic layout techniques in accordance with an embodiment of the current invention. It will be appreciated that system 100 may facilitate the use of dynamic data, as well as supporting dynamic layout changes resulting from other sources, such as user-generated or application-initiated changes.

Server-based system 100 may comprise two main interconnected sub-systems, a client component 110 and a server component 120. It will be appreciated that there may be more than one client component 110, connected to server component 120 at any one time. It will be further appreciated that there may two types of client components—an editor client 110A (used by the application designer) and a viewer client 110B (used by an end user of the application). It will also be appreciated that both the editor client 110A and the viewer client 110B may be implemented either using the same architecture and technology—for example, both are FLASH-based downloaded applications, or both are iOS-based applications—or may use entirely different architecture and technology to the same advantage. A browser based application may also be used, which may be downloaded but combines both client and server side work. Clients 110A and 110B may also have different screen sizes and geometries used for display. It will also be appreciated that both clients 110A and 110B may be personal computers with a full browser and full HTML support, or may be smartphones or tablets, or alternatively may be an application embedded within a social network. The latter may internally limit the availability of HTML and JavaScript which can be used in the application display (e.g. for security reasons or due to limitations of its embedded browser).

Server 120 may comprise a website application 60, a dynamic layout editor 70 and a data repository 80. Website application 60 may also be installed locally on clients 110A and 110B. Data repository 80 may store the pages and templates 65 pertinent to website 60, together with component information as well as rules and parameters pertinent to dynamic layout actions.

Figure 4B:
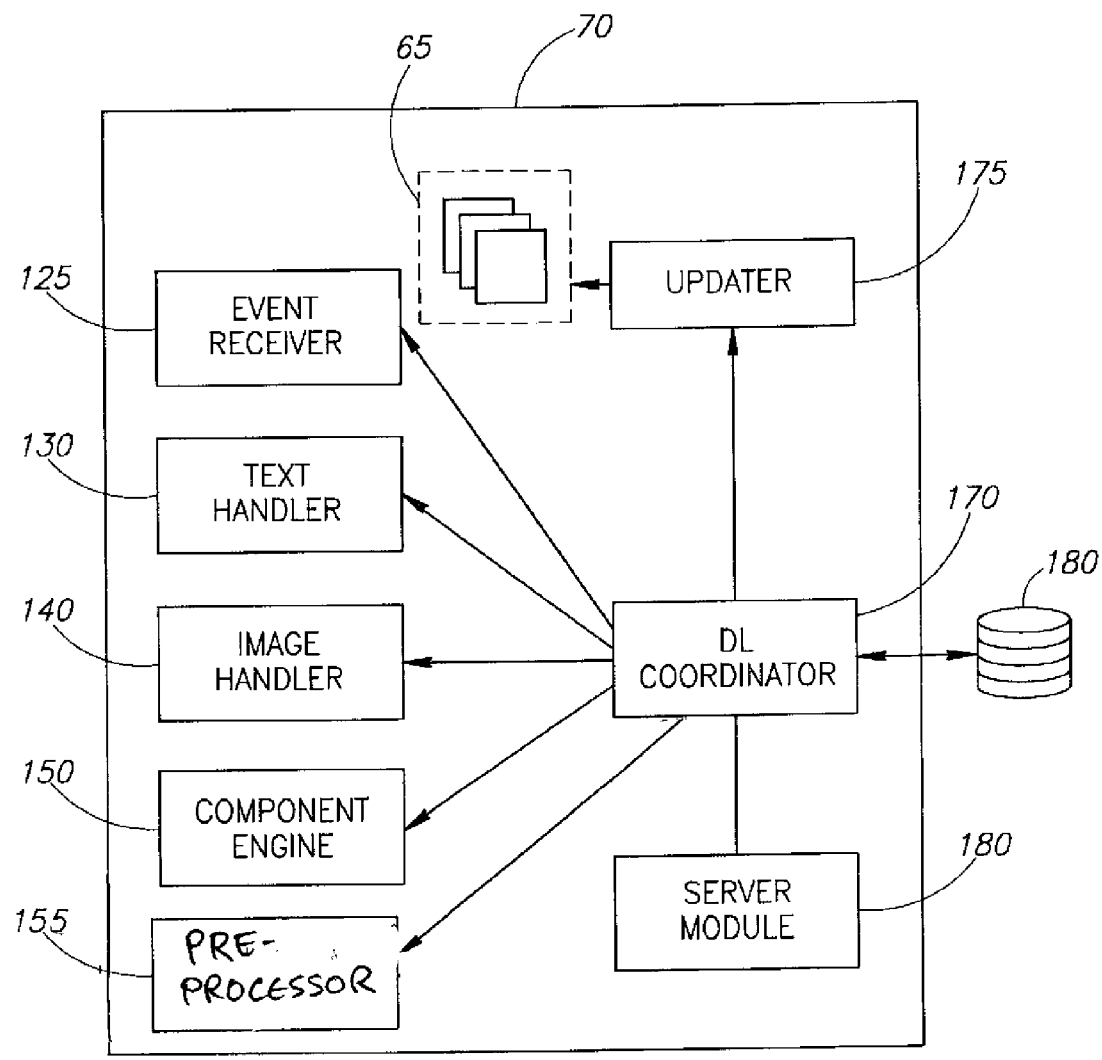
FIG. 4B is a schematic illustration of the elements of a dynamic layout editor; constructed and operative in accordance with the present invention.

Dynamic layout editor 70 may comprise an event receiver 125, a text handler 130, an image handler 140, a component engine 150, a dynamic layout coordinator 170, a pre-processor 155, an updater 175 and a server module 180 as illustrated in FIG. 4B to which reference is now made. Event receiver 125 may receive dynamic layout events caused by dynamic layout triggers. Dynamic layout coordinator 170 may coordinate the dynamic layout events between one or multiple clients 110 and server 120 by coordinating the flow of information between changes made by website designer or end-user 5 working on client 110. User 5A situated at client 110A may make changes to the pertinent template such as change the size of a component, addition of a picture etc. The pertinent change may be received by event receiver 125 which may forward the information to dynamic layout coordinator 170 which may coordinate the appropriate edits to website 60 according to the dynamic layout rules held in repository 80 Text handler 130 may handle different fonts, font sizes and text reformatting, image handler 140 may adjust the scaling of images, component engine 150 may change the actual structure of the components, pre-processor 155 may preprocess for specific targets and un-displayed areas and server module 180 may aggregate, limit and filter ingoing and outgoing data. Once the appropriate edit has been made, updater 175 may update templates 65 accordingly in order for a second user 5B situated at client 110B to see the change.

In an alternative embodiment to the present invention, dynamic layout editor 70 may also be implemented on the client side as part of client 110, for example using a locally installed visual design system, a dynamically downloaded application (such as a Flash application) or a browser-based application (which runs inside the client browser using technologies such as HTML5 and JavaScript).

In yet another alternative embodiment to the present invention, dynamic layout editor 70 may be implemented on both server 120 and client 110. For example, system 100 may handle dynamic layout processing based on triggers activated by client 110 and handle dynamic layout processing based on triggers resulting from server-side activities (such as on-line data feeds) on server 120. The division of tasks may also be dynamic, shifting tasks between the two as necessary (e.g. to optimize performance and bandwidth usage).

Figure 5A:
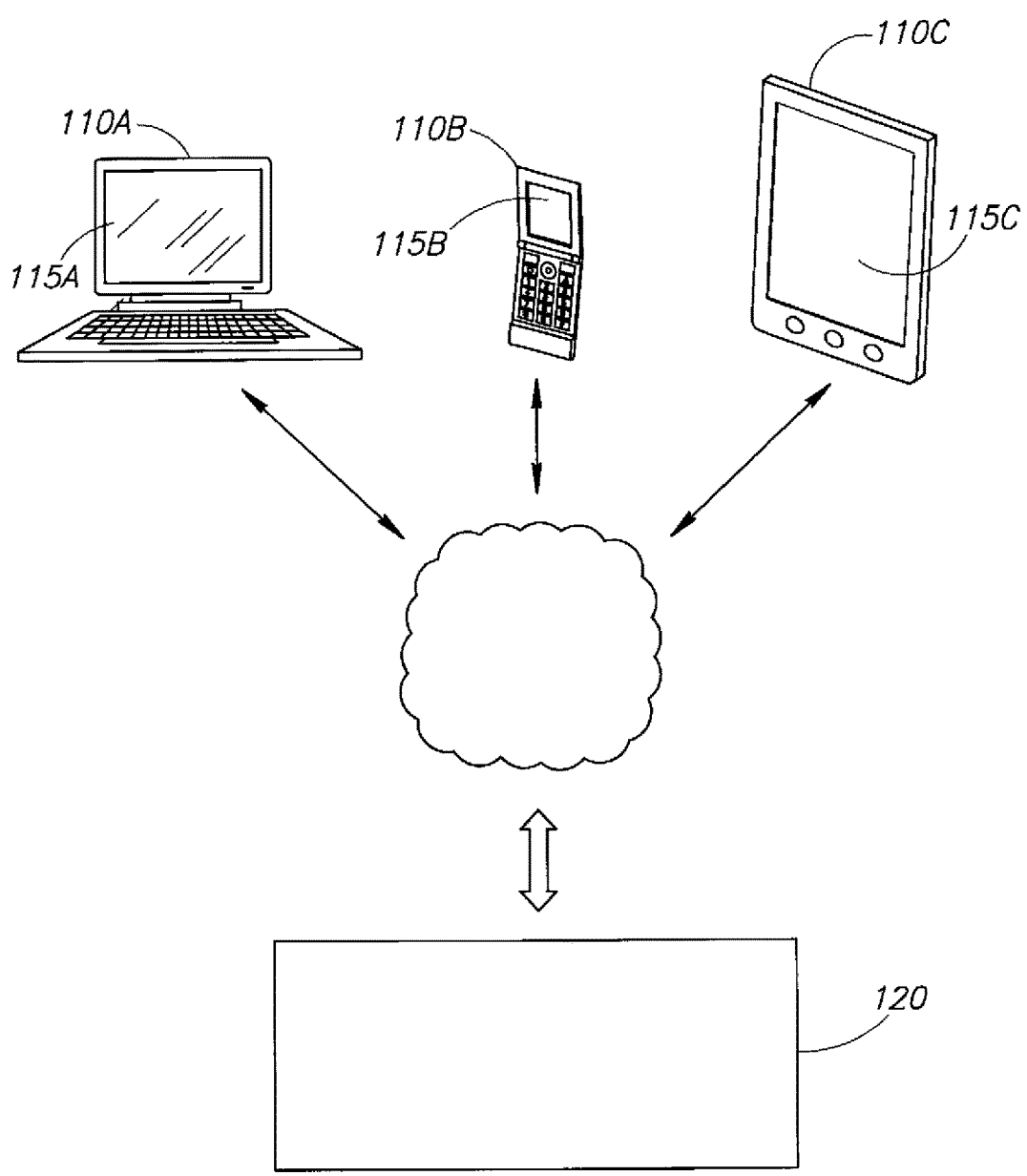
FIGS. 5A, 5B and 5C are schematic illustrations of different client side embodiments of the system of FIGS. 4A and 4B, constructed and operative in accordance with the present invention.

It will also be appreciated that there may be numerous embodiments for the client component 110. In an alternative embodiment to the present invention, as illustrated in FIG. 5A to which reference is now made, client 110 may be a software component running on a client computer 115. The software may be a pre-installed application, a dynamically downloaded application (such as a Flash application) or a browser-based application (which runs inside the client browser using technologies such as HTML5 and JavaScript). The hardware used may typically be a personal computer 115A, a smartphone 115B, or a tablet 115C etc. all connected through a communication medium such as the Internet to server 120.

Figure 5B:
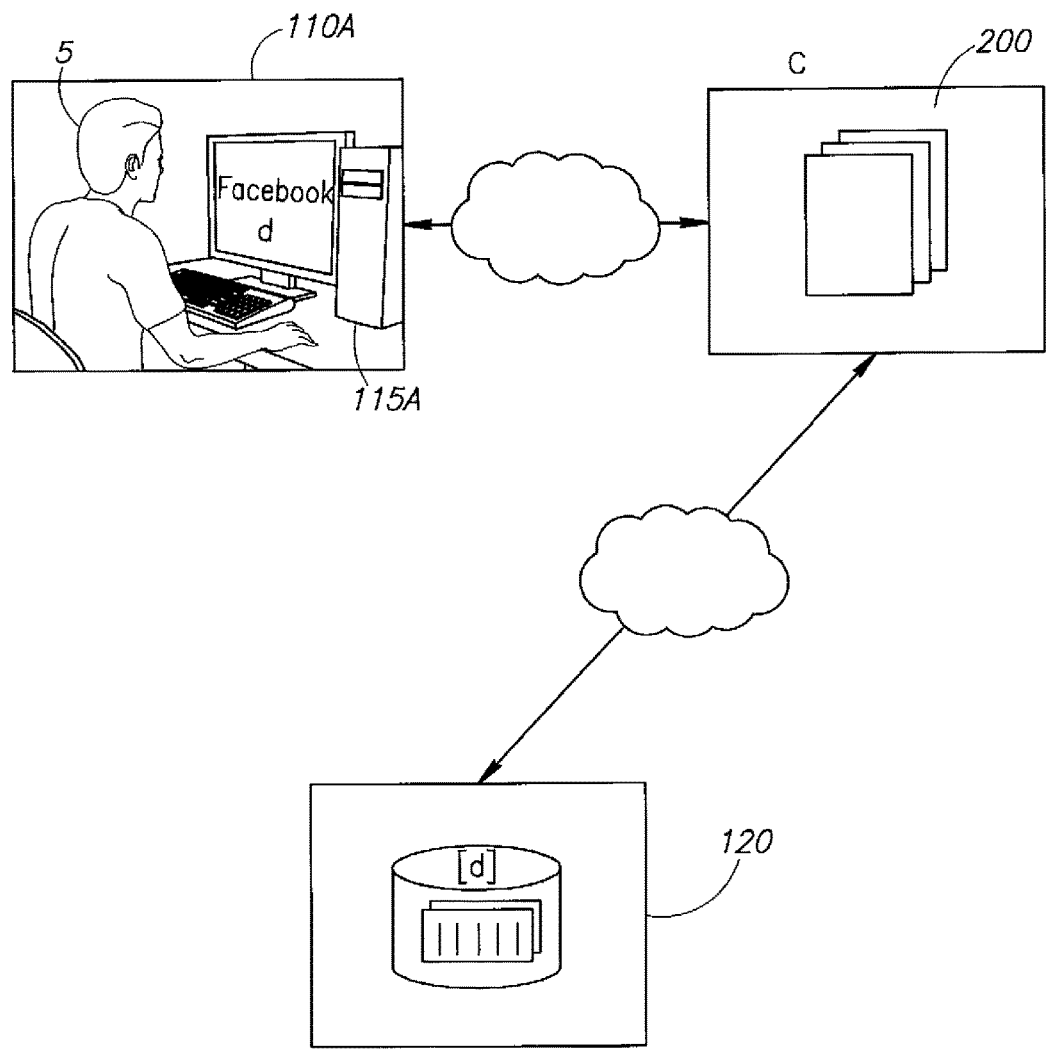

In an alternative embodiment to the present invention, client 110 may be integrated with a larger software system so to provide a rich media application editing, layout and display services inside the larger software system. This could be through the use of integration technologies (such as Microsoft's ActiveX technology) or by being embedded as a specialized plug-in inside the larger system (for example by integrating the client sub-system as Facebook application). Reference is now made to FIG. 5B which illustrates an end user 5 on personal computer 115A, viewing a social network site (such as Facebook) which is served by the Facebook company servers 200, containing an area [d] containing an application to be edited. In order to edit [d], servers 200 may contact server 120 in order to access developed applications.

Figure 5C:
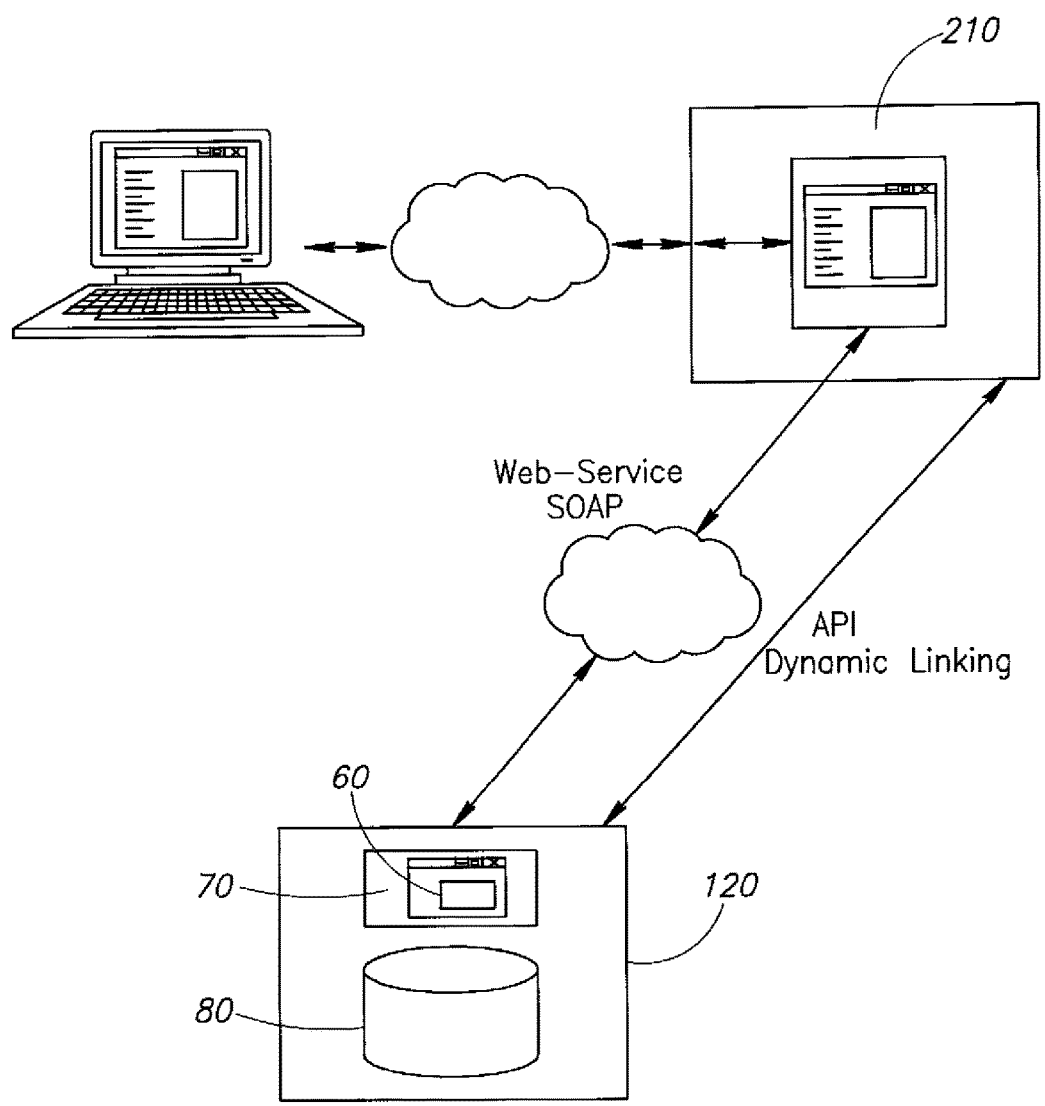

In yet another alternative embodiment to the present invention, client 110 may be integrated with a larger software system which provides its own editing and display user interface. System 100 may be used only as a back-end engine to provide content formatting and layout information, but the actual edit-time and run-time display is performed by the larger software system as is illustrated in FIG. 5C to which reference in now made. This larger system 210 and server 120 may be connected via a direct Application Programming Interface (API), dynamic linking, a web services interface (such as SOAP) or any other program-to-program interface.

It will be appreciated that work may be divided between the client and server components (110 and 120) as required for the specific web site design system (as described herein above) and there may be various embodiments to the combination as is described herein below.

It will also be appreciated that system 100 may also be integrated with the same server infrastructure used to host the pertinent website to end users which use the pertinent web site (and are not involved in its creation). It will also be appreciated that this server does not have to be the same physical server, as such systems typically employ numerous servers in a load-balancing or cloud configuration and these numerous servers may be optimized for specific sub-tasks.

It will be further appreciated that the client-side software does not have to be installed, or otherwise permanently reside on the client computer used by the end user. It may of course be installed on it, but it may also be downloaded on demand, using technologies such as Adobe Flash, browser-based JavaScript or Java.

In accordance with an embodiment of the present invention, system 100 may be built using server assisted dynamic layout. Tasks related to dynamic layout may be performed with the assistance of server 120 which may cooperate with either client 110A or 110B via dynamic layout coordinator 170. The direct actions of the designer or end-user 5 working on the created web site or application may trigger dynamic layout activity. It will be appreciated that such dynamic layout activity may often (but not always) be performed on the client side, so to provide immediate response to designer or end user editing actions and to avoid network latency during visual editing. However, even for such cases, server 120 support may be required in cases involving very low-power end-user machines and reasonable speed communication links to server 120.

In an alternative embodiment to the present invention, certain events triggering dynamic layout, such as changes resulting from dynamic data or from cooperation with concurrent users, do not require instant feedback, and therefore the required processing may be performed entirely by server 120.

It will also be appreciated that system 100 may create and maintain an internal data structure which contains the full dynamic layout information and is persistent across all editing sessions known as stored dynamic layout information (SDLI). This information may be stored in rules repository 80 which may sit on server 120. A copy of the information may also be stored locally on client 110 in cases where end-user 5 is allowed to modify certain aspects of the application (such as the size and position of certain components). There may be multiple versions of the stored dynamic layout information for the same stored application. This information may include anchor information, anchor creation history and the original position and size for each component affected by the dynamic layout as well as any designer or end-user set parameters. It will be further appreciated that website 60 may provide a suitable interface with the designer and/or end user 5 in order to receive such designer or end-user set parameters.

However, since many events that trigger dynamic layout such as changes resulting from dynamic data or from cooperation with concurrent users, do not require instant feedback, server 120 may entirely perform the required processing itself or may be assisted by server 120.

Figure 6:
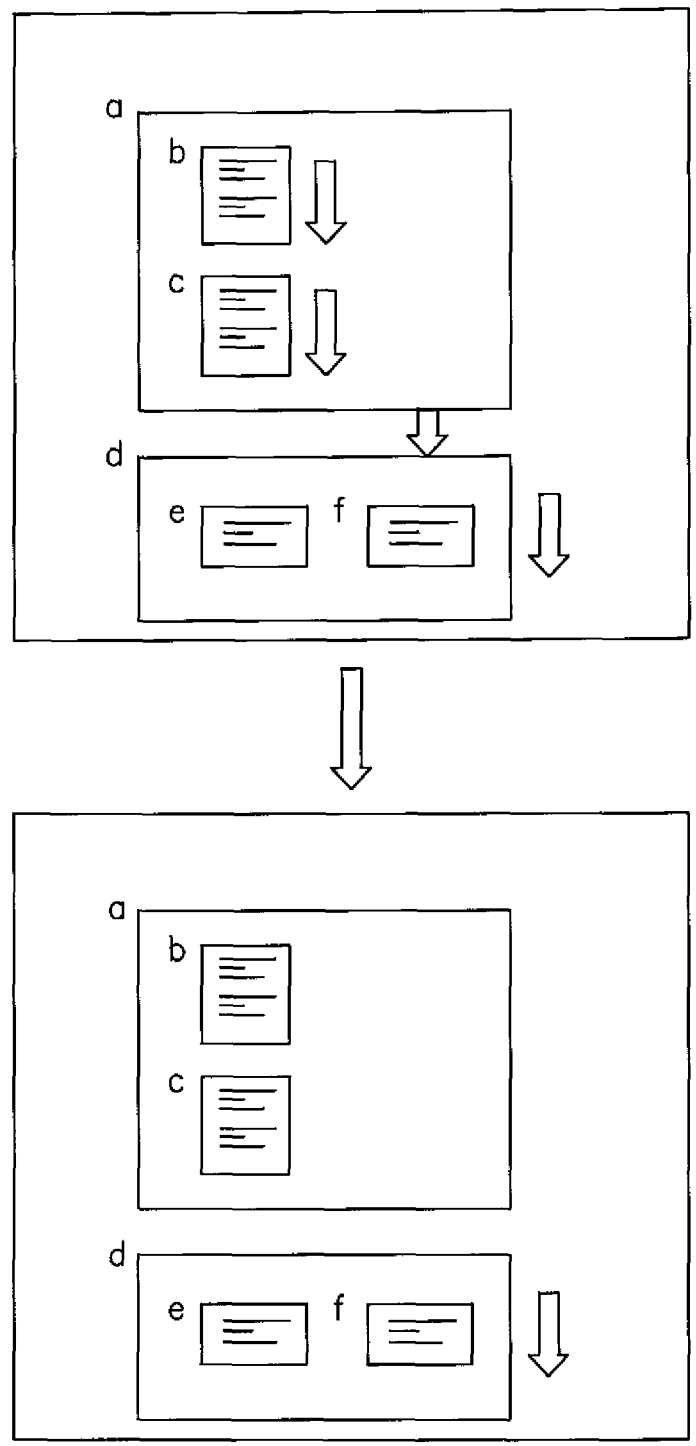
FIG. 6 is a schematic illustration of the use of container components in visual editing.

It will also be appreciated that system 100 may also provide server assisted dynamic layout services both at the component and container levels for different pages of the pertinent visual design system. The container in question may be a full page containing components, or it may be a sub-container inside the page or inside a large container as illustrated in FIG. 6 to which reference is now made. As can be seen, container [a] may contain components [b] and [c] and container [d] may contain components [e] and [f]. When the content of component [b] grows, it pushes down component [c] which expands container [a]. The expanded container [a], in turn, pushes container [d] and thus moves down components [e] and [f]. It will also be appreciated that component-level server assisted dynamic layout may be used to present modified versions of a specific component and that container-level server assisted dynamic layout may be used to calculate the modified layout of components inside a container or container set.

It will also be appreciated that component-level server assisted dynamic layout may include the actions needed to present modified versions of a specific component. The code implementing components in website 60 may run on the client-side software, such as the above mentioned iOS application or a browser based application. Alternatively the code does not have to reside on the client-side system but may still run on it (i.e. through dynamic downloading); it may also be completely server-side in cases where the system is completely server based and uses a very low CPU-power client. Certain elements may have a matching server-side element that implements some of the processing-intensive tasks related to dynamic layout.

Container-level server assisted dynamic layout may include an actual calculation of layout based on the properties of the collection of components which reside inside a single container, the calculation is not related to a single component but to the interaction between the set of components and the area in which they reside.

It will also be appreciated that server assisted dynamic layout may be performed by system 100 at a number of stages during the application editing process: System 100 may perform them fully on-line whenever a page is accessed by client 110 or even while the page is being viewed, whenever a new version of a given page or when the completed application is saved or published. System 100 may also perform server assisted dynamic layout in parallel to regular system functioning, based on collected information and usage patterns gathered from tracking actual application use, and not as response to a given page access or modification. This could be done, for example, during times of lower system load.

Figure 7:
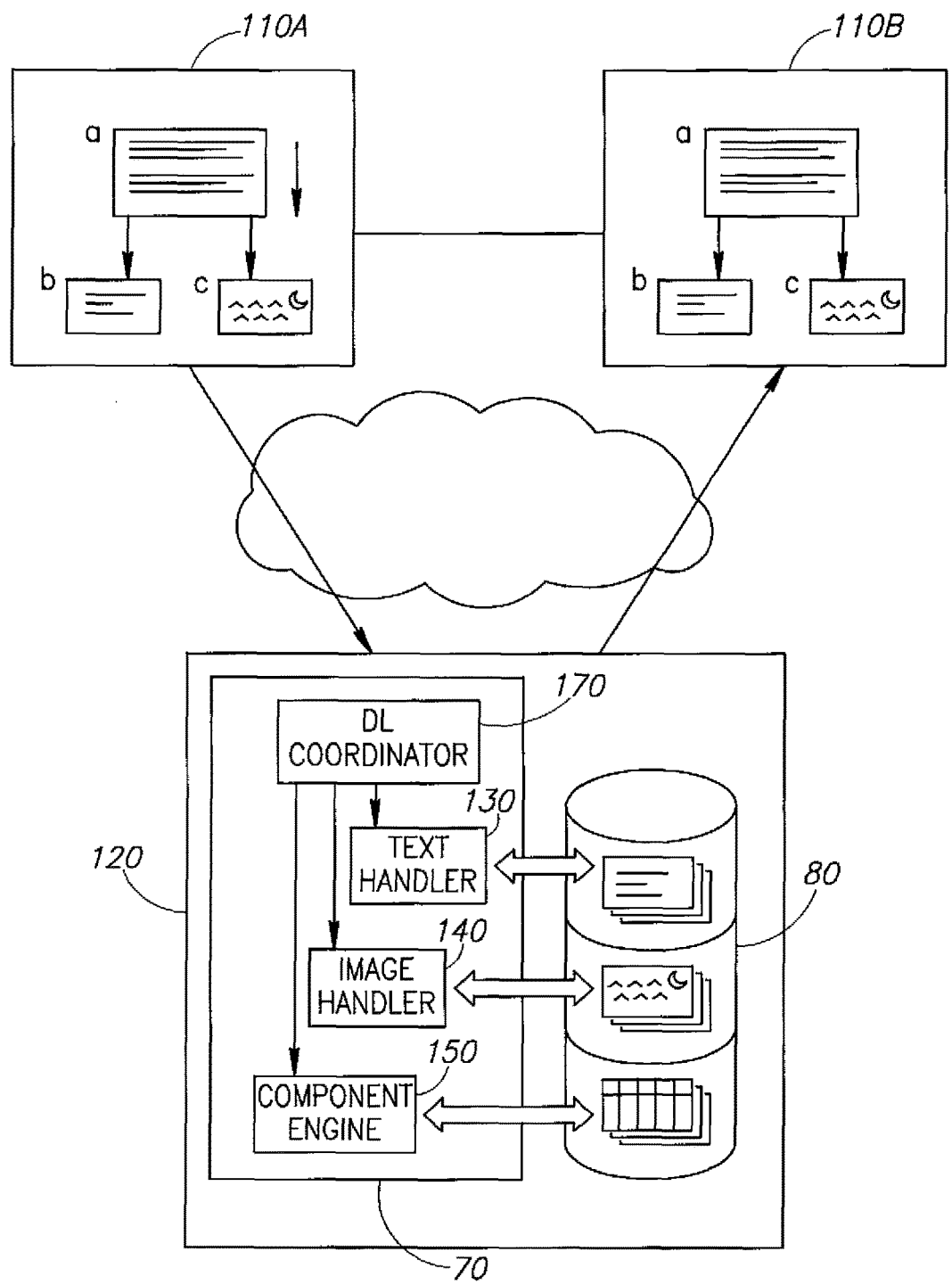
FIG. 7 is a schematic illustration use of server-assisted dynamic layout, constructed and operative in accordance with the present invention.

Reference is now made to FIG. 7 which illustrates 2 clients 110A (editing client) and 110B (viewing client) connected to server 120 and both showing the same content. If the content of component [a] on client 110A is modified it may cause component [a] to expand down. This may require components [b] and [c] in turn to shrink. Component [b] contains text which may have to be reformatted, and component [c] contains an image which may have to be shrunk. In this example, system 100 may offload the component resizing to server 120. Dynamic layout performed on client 110A may generate requests for different versions of specific components having different sizes. Server 120 may in turn generate resized (and possibly reformatted) versions of the components' content, a task which may be performed differently for each component type.

As mentioned herein above, dynamic layout editor 70 may comprise dynamic layout coordinator 170 which may comprise a text handler 130, an image handler 140 and a component engine 150. It will be appreciated that for text-based components, text handler 130 may handle different fonts, font sizes and text reformatting. For image-based components, image handler 140 may adjust the scaling of the image to a different size or possibly change the amount of details in vector-based images (such as maps). Similar changes may apply to other media types (such as video) as well. For complex components (such as a store front component), an actual change in the structure of the components, including removing or adding graphical user interface elements for the specific component may be dealt with using component engine 150.

It will be further appreciated that the above mentioned operations may typically be performed on-line, with server 120 responding to specific client (110A and 110B) requests. However, server 120 may also cache requests, so the processing done for client 110A using a specific screen size would be immediately useable for additional users of the same application which deploy it on a system of similar size such as client 110B. These cached versions of the components may be stored (taking images for example) using a data structure such as an image pyramid or mipmaps.

It will also be appreciated that the design environment of system 100 may use absolute positioning to provide a high quality website layout (in both the editor 110A and viewer 110B clients) to support automatically generated changes to the designer-defined layout. It may also integrate dynamic layout management as well as dynamic content separate from the design information. Dynamic layout editor 70 may be integrated with both the editing and the viewer components (110A and 110B), so the same dynamic layout rules can be applied to changes in website 60 resulting from explicit design actions (by the site designer), as well as to changes in the web site resulting from changes in the dynamic information included in website 60. These dynamic layout rules are discussed in further detail herein below.

It will be appreciated that there may be different embodiments to system 100 regarding the server 120/client (110A and 110B) relationship when dynamic layout processing is performed. Some of these embodiments are described herein below. In most of these cases, server 120 may modify the stored dynamic layout information data stored on it. This could be the stored dynamic layout information of currently un-displayed pages (which would be loaded when required), or that of currently displayed pages (which would be synchronized with the client-side version of the same information).

Target-Specific Dynamic Layout Processing.

As discussed hereinabove, system 100 may have clients 110 of multiple types accessing the same application. Clients 110 may have different characteristics, and may employ completely different technologies for the display of the application. Clients 110 may further have different screen sizes and geometries used for display. In order to overcome these obstacles, the application in question must be adapted to each of the different display platforms and display screen geometries. In existing systems known in the art, there are two major approaches to this problem of adaptation. One approach is editor-side adaptation—editor client 110A creates multiple versions of the application each time the application is saved, or alternatively when the application is finally published and loaded into a server for access by the viewing clients. Another approach is viewer-side adaptation—editor client 110A saves the application in a generic format (be it a database format, a collection of HTML or XML files or some other method) on server 120. Each viewer client 110B then performs the required adaptation of the application to his own platform and parameters.

It will be appreciated that when system 100 implements dynamic layout, there may be a substantial amount of work involved in the retargeting of the designed screen for all supported target platforms and screen geometries. This may involve position recalculation, re-rendering of text, resizing of images and other activities. It will further be appreciated that for dynamic layout triggered by content editing in editor client 110A, there is no problem, as the dynamic layout is calculated during editing and before the point in which the application is saved and/or published. In such a case, editor-side adaptation would be sufficient. However, for dynamic layout triggered from other sources (such as dynamic data or collaboration), dynamic layout is triggered during application viewing and cannot be pre-calculated by the editing client 110A.

Figure 8:
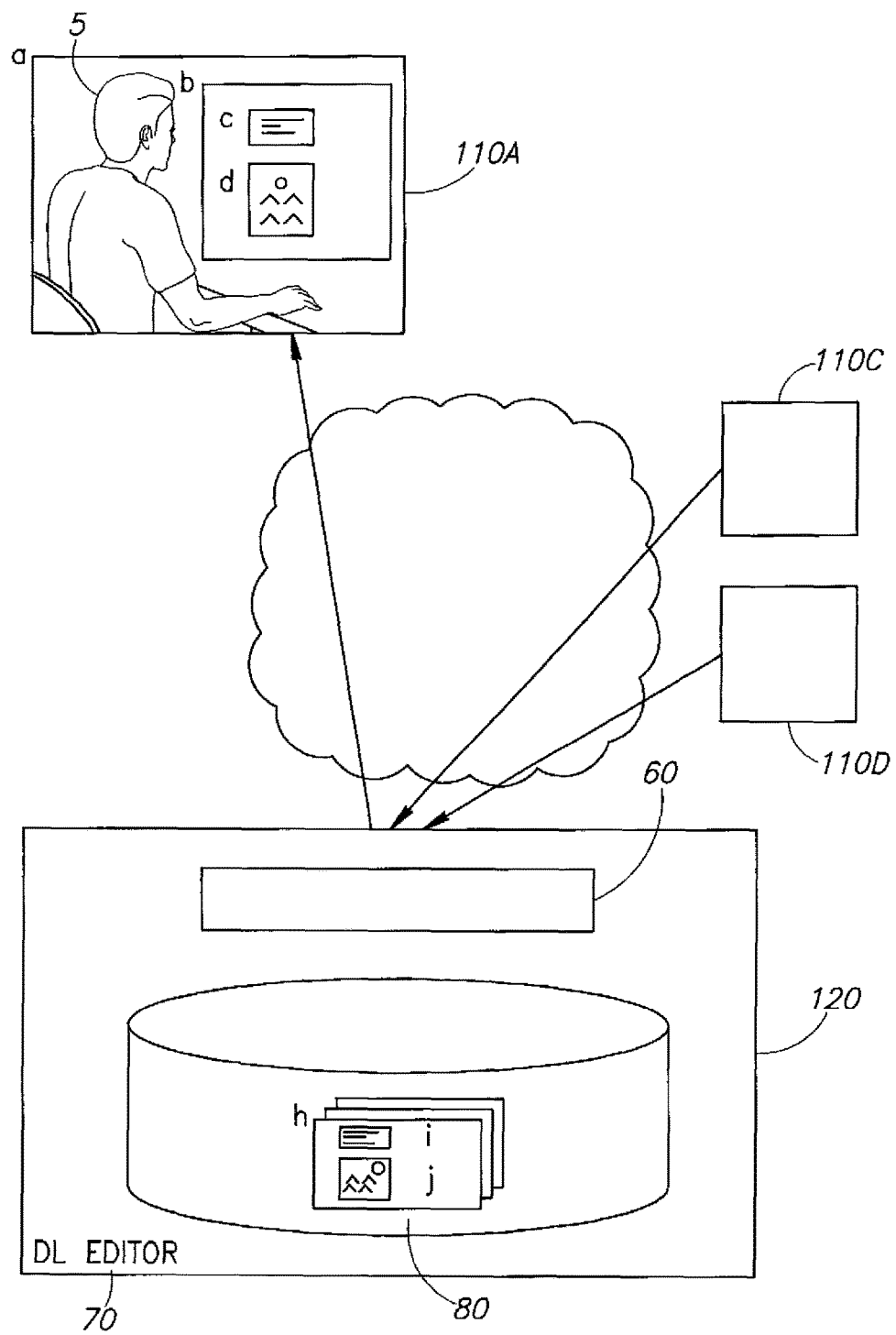
FIG. 8 is a schematic illustration of the use of server-assisted dynamic layout together with dynamic data, constructed and operative in accordance with the present invention.

In accordance with an embodiment of the present invention, the processing required for dynamic layout related to multiple target platforms and multiple screen geometries may be performed by server 120. Reference is now made to FIG. 8 which illustrates end-user 5 working on client 110A and who is viewing application screen b containing components [c] and [d]. It will be appreciated that client 110A may receive screen [b] via server 120 which is running website 60 and holding repository 80 integrated with dynamic layout editor 70. It will also be appreciated that repository 80 may contain the various pages of the application being viewed, which in turn may contain the full data [i] and [j] for the multiple instances of the components [c] and [d]. Event receiver 125 may receive updates from client 110C which may affect the content of the instances of the component [i]. Event receiver 125 may also receive updates from another client system 110D which may modify the contents of the instances of the component [j]. Dynamic layout editor 70 may then perform the required dynamic layout changes on the instances in repository 80 as required.

It will be appreciated that this method of operation may decrease the workload on client 110A, which may receive a version of website 60 already adapted to the specific client, and would not be required to reformat it. In addition, the work is performed once per target platform, and is not performed repeatedly by numerous clients 110 accessing the application. It will be appreciated that in the way, server 120 may perform the entire dynamic layout work or may partially perform some of the time consuming leaving part of the work for client 110A to perform.

Un-Displayed Area Processing.

It will be appreciated that when end-users 5 (using both editing and viewing clients) browse an application, a single specific application page is typically displayed at any given time. There are numerous sections of the application which are not displayed at any given moment, including (but not limited to) the following: pages other than the current page; hidden areas in the current page, such as occluded areas or off-screen area (to which end-user 5 may scroll or switch) and application pop-up graphical user interface elements which are not displayed currently.

It will be also appreciated that even though these areas are not visible at any given time, they may still require dynamic layout changes. This could be due to changes to the application resulting from external sources (such as dynamic data and collaborative authoring). This could also be, for example, due to designer or viewer initiated changes which affect off-screen areas, e.g. changes to component which are visible from a number of screens (such as a large e-Store object which is visible from multiple screens in the application). These areas may be disjointed dynamic-layout wise—from the currently displayed areas, e.g. separate application pages which do not interact with the currently displayed page. They could be, however, areas which would interact with the currently displayed area when they would be displayed, e.g. the un-displayed areas of components which may provide additional information on demand. In the latter case, server 120 may pre-process alternative layout information for the page based on the case in which the additional information would be displayed.

Figure 9:
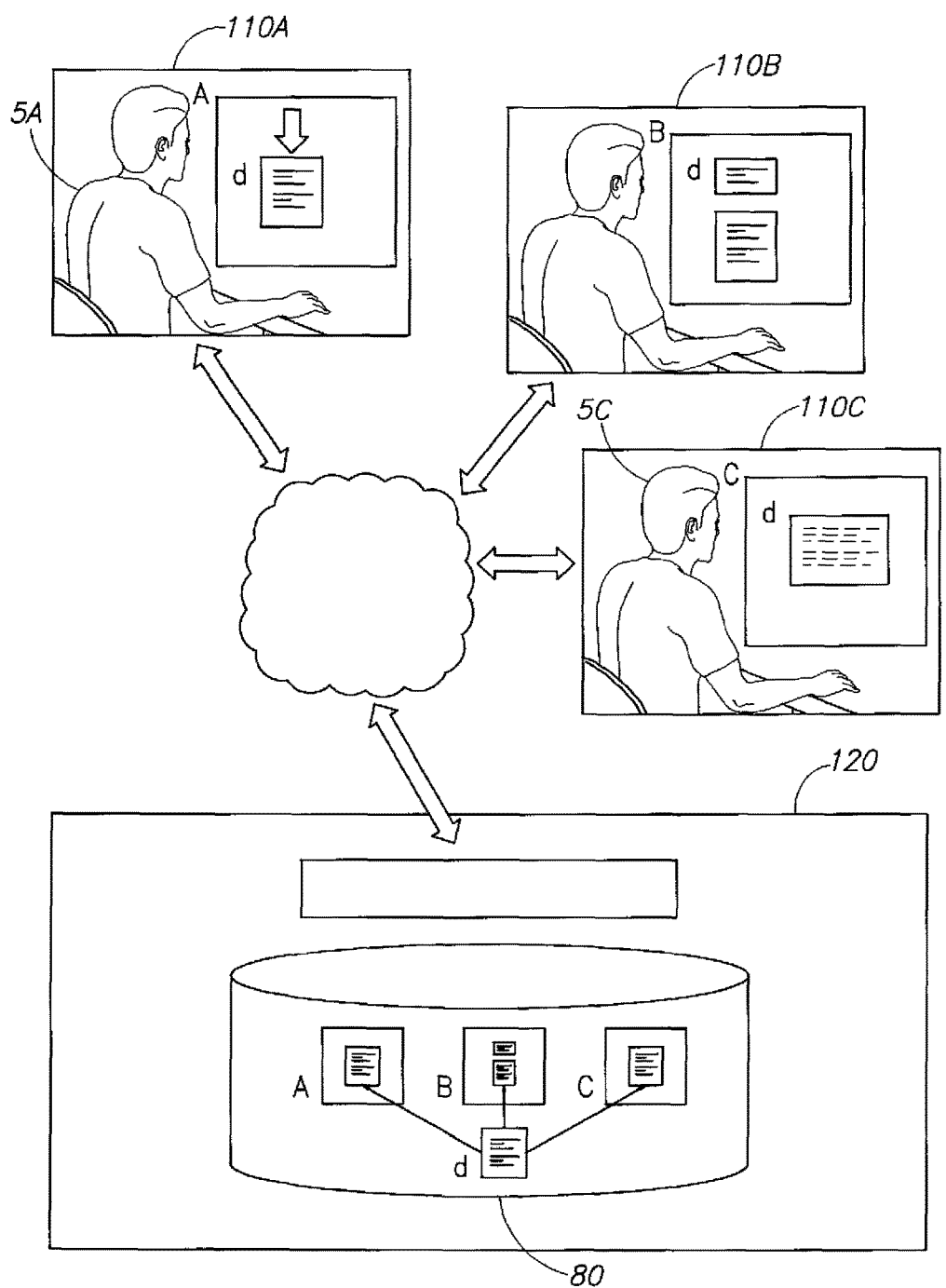
FIG. 9 is a schematic illustration of the use of server-assisted dynamic layout together with collaborative authoring, constructed and operative in accordance with the present invention.

It will be appreciated that in all of these cases, the dynamic layout processing for the non-displayed areas may be performed by server 120 without affecting the interactivity or response speed of system 100. An example of this is a system in accordance with an embodiment of the present invention which supports full collaboration between users, so that concurrent editing is possible. Reference is now made to FIG. 9 which illustrates an application containing pages A, B and C. Only page A is displayed on client 110A and viewed by user 5A. However, changes in layout made by another user 5B may affect the layout of page B. Also, changes to the content of the text component [d] which is visible on page A as well as pages B and C may require dynamic layout changes in all pages A, B and C. Client 110A may perform dynamic layout changes to page A in order to provide an immediate and interactive response. Server 120 may also repeat the changes to page A and may also perform the same (or equivalent) changes on pages B and C so that the updated version of page B may be displayed to user 5B who is viewing page B of the application on client 110B concurrently with user 5A. The required changes may be somewhat different between pages A, B and C since each page may have specific constraints affecting the dynamic layout process.

Sites Sharing Single Design but Multiple Data.

An alternative embodiment to the present invention may employ the single design/multiple data (SDMD) model of application specification. In this model a single common design template is used by multiple applications having different content data. The template specifies the general structure of the fields, their interaction (e.g. pressing a button X will link to screen Y) and the content for some fields. Each of the multiple data instances of the application has its own set of field values and content. One example could be an electronic catalog application, in which the template would contain the layout and definition of the catalog, and the actual catalog item data (text, images etc.) would be part of each application using this catalog template.

It will be appreciated that each of the separate catalog applications based on the same catalog template may require dynamic layout processing due to different data content. Furthermore, such an application may be built on-line (by a designer who provides the component content through the on-line editor) or off-line (by automatically generating a new catalog application using the catalog template and data imported from external data sources).

Figure 10:
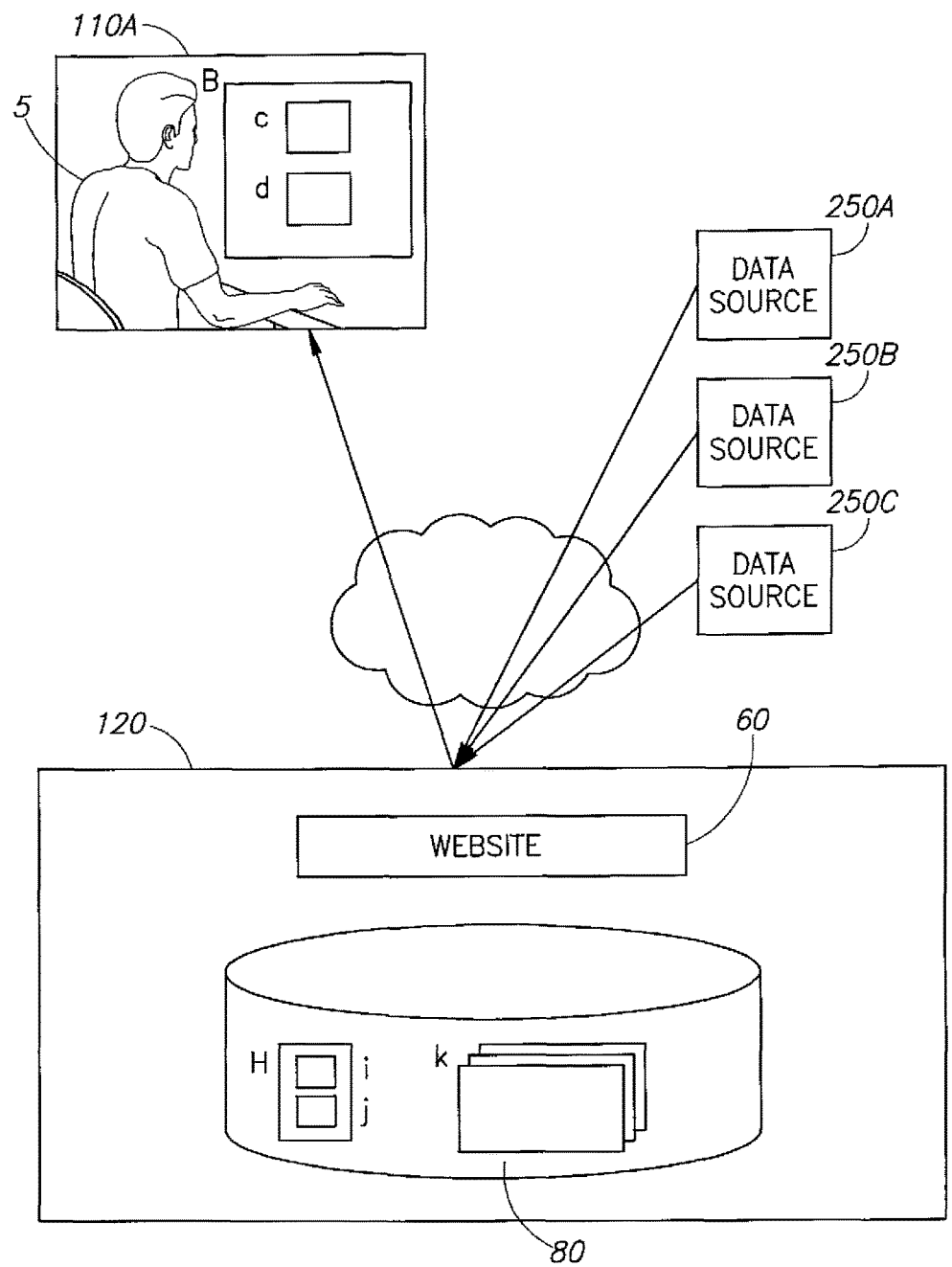
FIG. 10 is a schematic illustration of the use of server-assisted dynamic layout together with imported data, constructed and operative in accordance with the present invention.

It will also be appreciated that server assisted dynamic layout is especially helpful for applications which are built using imported data (i.e. off-line), otherwise known as external data applications. These applications require dynamic layout in order to handle the changes in the screen layout caused by the imported data. In systems which implement server assisted dynamic layout, processing the dynamic layout changes triggered by external data changes may be performed before pages are loaded by the client. In accordance with an embodiment of the present invention, server 120 may implement dynamic layout processing without requiring client-side processing. Reference is now made to FIG. 10 which illustrates end-user 5 working on client system 110A and who is viewing application screen B which contains the components [c] and [d] that reflect imported data in the single design/multiple data scenario. Client 110A may receive screen B from server 120. Repository 80 may contain the design and layout information H for screen B as well as the design and layout information [i] and [j] for components [c] and [d]. It will be appreciated that the actual data is stored in repository 80 for multiple instances of the application, together with specific layout information for each instance of the application, such layout being affected by the actual data being imported into instances of [i] and [j] from the data sources 250A, 250B and 250C. Dynamic layout editor 70 may perform the required dynamic layout changes on the instances in repository 80 as required.

Dynamic Data Aggregation and Limiting.

Certain applications may contain components that reflect external data, and this data may change rapidly (e.g. stock rate information or news-wire item display). This in turn would cause rapid changes to the displayed application and require rapid reactivation of the dynamic layout mechanism.

Figure 11:
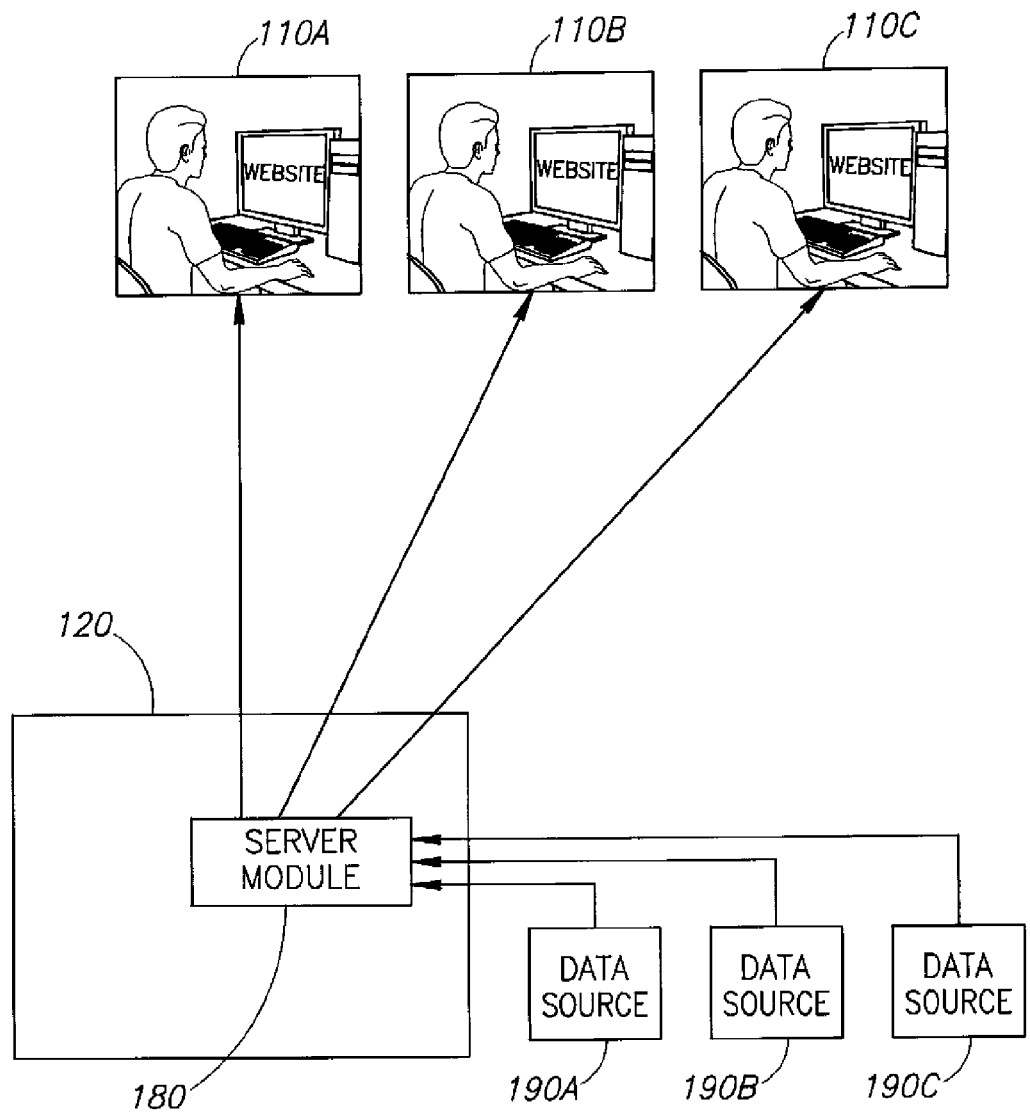
FIG. 11 is a schematic illustration of the use of server-assisted dynamic layout together with data aggregation, constructed and operative in accordance with the present invention.

As opposed to the prior art where each client has to connect to each individual data sources separately, in an alternative embodiment to the present invention, server 120 may provide an aggregation service, so that each client 110 may connect to a server module 180 which may receive updates from the data sources 190A, 190B and 190C as is illustrated in FIG. 11 to which reference is now made. Dynamic layout coordinator 170 may then coordinate the required update to the dynamic layout of the application accordingly. It will be appreciated that such data aggregation may be particularly useful when used in conjunction with collaborative authoring. Server module 180 may combine the updates arriving from multiple designers in order to provide a single update version which will refresh the displayed page layout for all concurrent designers. This way, collaborative authoring and the resulting dynamic layout changes required by it may require a one-to-many communication instead of a many-to-many communication between the participating designers.

Furthermore, server module 180 may provide update limiting. Clients 110A, 110B and 110C connected to server 120 may have different capabilities, processing power and communication bandwidth. In an alternative embodiment to the present invention, data server component 180 may filter the information updates going out to the clients 110A, 110B and 110C accordingly. For example, client 110A with low processing power or narrow communication bandwidth may receive only some of the changes and not all of them when the change in frequency is too high. This way the low processing power/narrow bandwidth clients 110 may keep up with the rest of the system.

It will be appreciated that in order to implement system 100 to aid dynamic layout, certain dynamic layout rules must be applied. Each dynamic layout rule may describe a situation in which a change to an element of the designed application may affect another element within the same designed application. Such an element may be a component, a container or the content of a given component. It will be further appreciated that the relationship between the affecting element A and the affected element B may be automatic or explicit, using automatic or explicit anchoring. The effect on the affected element B may be that of moving it or resizing it or (in some cases) both. For the sake of clarity, each triggering of a dynamic layout rule, in which changes to an element A may affect element B may be known as a dynamic layout event. It will also be appreciated that the dynamic layout concepts and rules as described in more detail herein below may also be implemented locally on a client 110 without server 120. It will be further appreciated that system 100 may employ a plurality of dynamic layout rules having a plurality of attributes and parameters (described in more detail herein below). It will be further appreciated that the dynamic layout rules may form part of the stored dynamic layout information and may be stored in data repository 80.

There may be multiple cases for dynamic layout events as discussed hereinabove such as user and system initiated layout display, use of multiple target platforms, differences in user screen size, dynamic data etc. It will be appreciated that some of these events may be local and focus on a single given component. Other events may be global and may generate multiple dynamic layout events which must be handled together in order to derive a new layout. For example, a change in display screen size such as opening the application on a smaller screen may require a dynamic layout change to all the components on the screen.

Figure 12A:
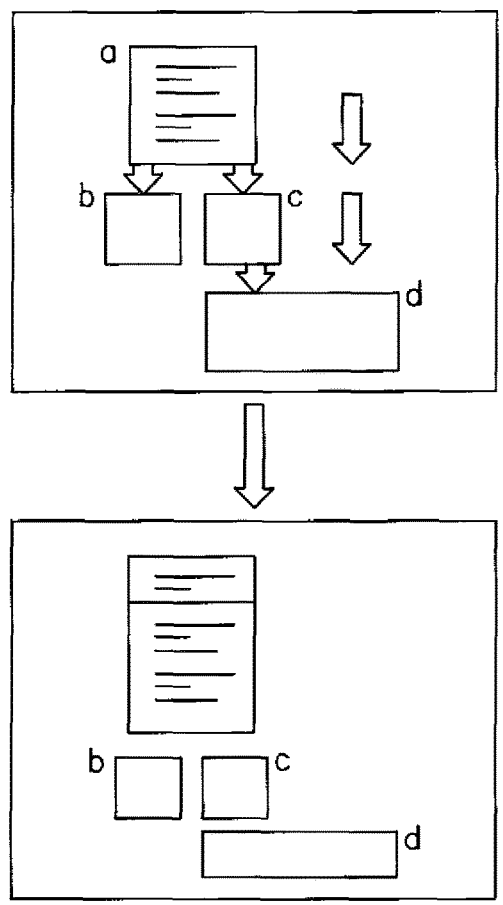
FIG. 12A is a schematic illustration of a dynamic layout event that triggers multiple additional dynamic layout events, constructed and operative in accordance with the present invention.
Figure 12B:
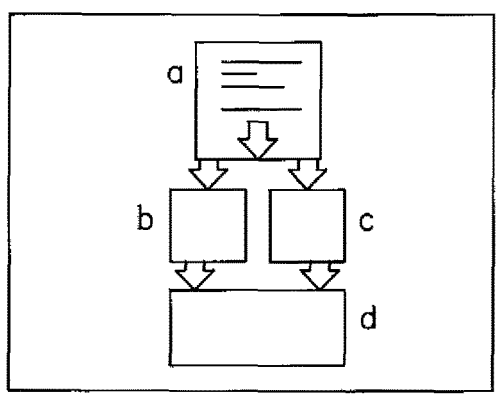
FIG. 12B is a schematic illustration of multiple dynamic layout events merged into a single dynamic layout event, constructed and operative in accordance with the present invention.

It will also be appreciated that dynamic layout events can be staggered so that the execution of one event may trigger another. Reference is now made to FIG. 12A which illustrates such a staggered execution. As can be seen, component [a] may expanded due to a content change. This expansion may cause components [b] and [c] to move down which in turn may cause component [d] to shrink. Dynamic layout events may also be merged. Reference is now made to FIG. 12B which illustrates such a merge. Component [a] expands downwards pushing components [b] and [c] which in turn push component [d]. It will be appreciated that the dynamic layout events that are created by the movement of components [b] and [c] may be merged into a single event since both components [b] and [c] push component [d] equally the same amount in the same direction.

It will be further appreciated that the rules and examples provided hereinabove and herein below for the sake of clarity, are detailed in terms of vertical movement of components in the downward direction. This direction is known as the primary direction of the dynamic layout process. It will further be appreciated that dynamic layout may be facilitated in all directions (up, down, left and right). Each container or page may specify the direction in which their components may move. For example, a header on a page may require a more rigid layout, permitting expansion in the downward direction only, whereas content areas below the header may require less rigidity in design and may allow dynamic layout in different directions. It will also be appreciated that a combination of directions may also be implemented. These attributes may be set by the designer or end user 5 for each component or container. Components may be marked to grow, shrink or move independently in any of the four directions. The lower edge may move downwards, for example, without affecting the other three edges.

Figure 13A:
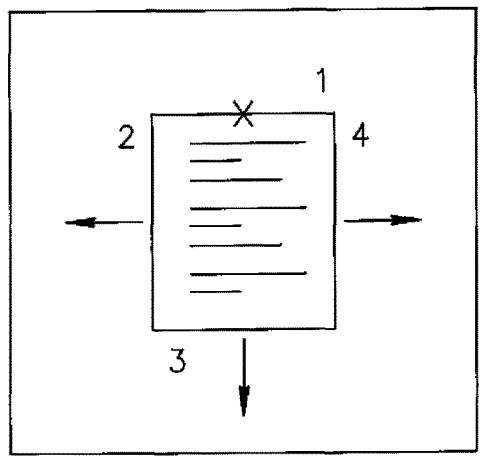
FIGS. 13A, 13B and 13C are schematic illustrations of component edge locking, constructed and operative in accordance with the present invention.
Figure 13B:
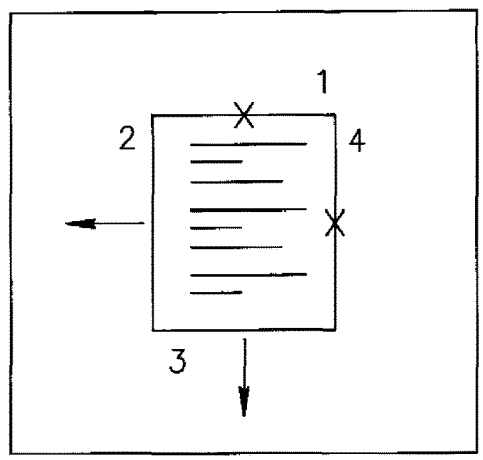
Figure 13C:
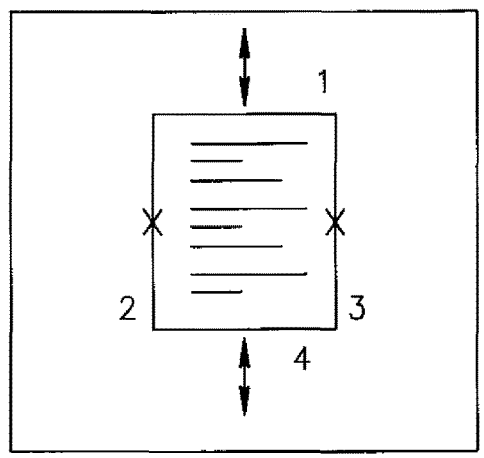

It will be further appreciated that each of the four edges of a component (or a combination of them) may be locked. A locked edge is explicitly anchored to the closest edge of the container containing the pertinent component as is illustrated in FIG. 13A to which reference is now made. Side 1 may be locked allowing the component to grow and move left, right and/or down. Reference is now made to FIG. 13B which illustrates the same component as FIG. 13A but with sides 1 and 4 locked. In this scenario the component may only expand (or shrink down) to the left, but cannot move. If two parallel edges are locked such as edges 2 and 3 as is illustrated in FIG. 13C, to which reference is now made, the component may still move in the other two directions, i.e. in this case up and down, and may also expand or shrink both up and down.

Each of the four corners of the component may also be locked. This is essentially a shortcut specifying that the two edges which meet at the given corner are edge locked.

Figure 14A:
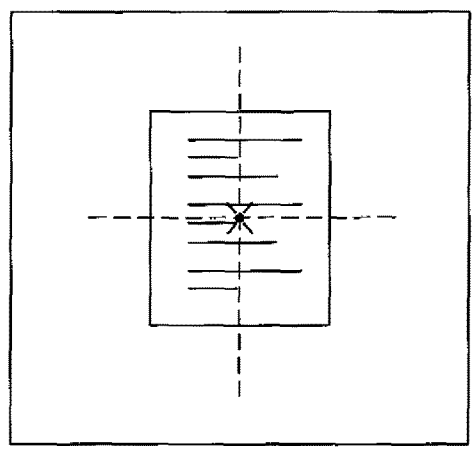
Figure 14A:
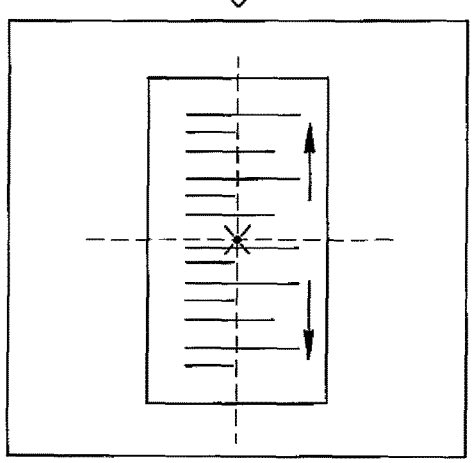
Figure 14B:
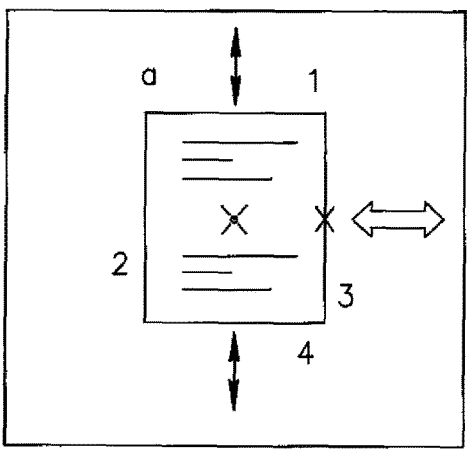

It will be further appreciated that the center of a component may also be locked as is illustrated in FIG. 14A to which reference is now made. In this scenario, changes to the component must leave the center in the same position; therefore the component may not be moved and may only expand/shrink. A combination of edge locking and center locking may also be implemented as is illustrated in FIG. 14B to which reference is now made. In this scenario the center of component [a] is locked, as is edge 3. Since both are locked, edge 2 (in parallel with edge 3) is also automatically locked. Component [a] may not move, but may expand/shrink by moving edges 1 and 4.

Components may also be marked with a "preserve aspect ratio" i.e. their existing aspect ratio, the proportion between their height and width cannot be changed. If no edge or center locking is specified, the lock is by default the top left hand corner of the component. In this scenario, as is illustrated in FIG. 14C to which reference is now made, if edge 4 has to move downwards to compensate a content change due to a dynamic layout event, edge 3 would automatically move right in order to preserve the existing aspect ratio of the component. If however, the top right hand corner has been locked (as illustrated in FIG. 14D), edge 3 would remain in the same position and edge 2 would move to preserve the ratio with edge 4.

As has been discussed hereinabove, dynamic layout events and rules may typically cause components to change their size and position compared to their original size and position as specified by the designer of the system. It will be appreciated that when the trigger that caused the dynamic layout event is reversed (fully or partially), the changes to the affected component may also be reversed. It will be appreciated that the extent to which the layout change may be reversed is limited in that the affected component cannot move beyond its original position or size. This original size notion is applicable to both expanding and shrinking components. It will also be appreciated, that if a component has been modified due to automatic layout, and the designer makes a further explicit change to that component that affects its size, the new size becomes the new "original size" also known as original size reset. However, if the designer makes changes to the component that do not affect component size (such as changes to display properties), the original size is preserved by the system. The original size concept also may be applied to position changes. If a designer moves a component manually, the preserved original position will be set to the new value. This is also known as an original position reset.

It will be further appreciated (as discussed briefly hereinabove) that dynamic layout rules may include a combination of anchors created explicitly, automatically or semi-automatically. An anchor may be created between one or more components and/or framework elements such as a screen boundary. The given edge of a component may be locked with an edge of a different component or a framework element. A set of interconnected edges may be known as an anchor set. A designer may add or remove edges to an anchor set at will. There may typically be multiple anchors active at any one time and thus multiple anchor sets.

Figure 15:
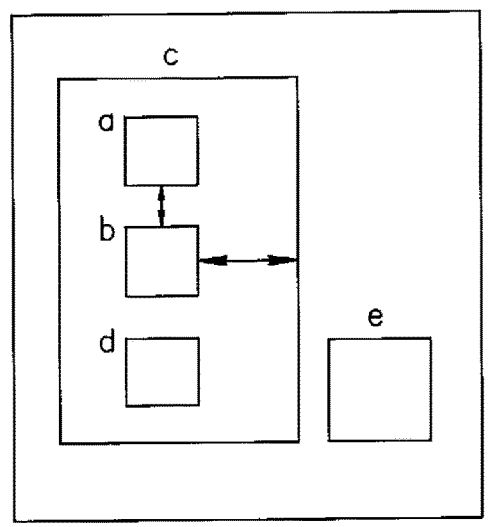
FIG. 15 is a schematic illustration of the interaction between anchors and containers; constructed and operative in accordance with the present invention.

Explicit anchoring may be performed by the designer using a pertinent user interface. The designer may create the specific anchoring between parallel edges and/or framework elements by selecting these edges and specifying that an anchor is to be created between them. It will be appreciated, that anchors are always created between components located inside the same container (or page). Reference is now made to FIG. 15 which illustrates such an arrangement. Components [a] and [b] which are situated within container c may be anchored to each other, components [d] and [e] which are not situated within the same container, may not. Explicit anchors are permanent until removed by the designer. It will be appreciated, that anchors are always created between components located inside the same container (or page), thus when explicitly anchored components are modified (moved, resized etc.), the explicit link remains. It will also be appreciated that explicit anchors may also be suspended so that the anchor remains in existence but does not trigger a dynamic layout event while suspended. It will also be appreciated that such anchors may be 'broken' such as by moving the pertinent component in or out of a container or by moving the component a distance which is further than a set limit.

Figure 16:
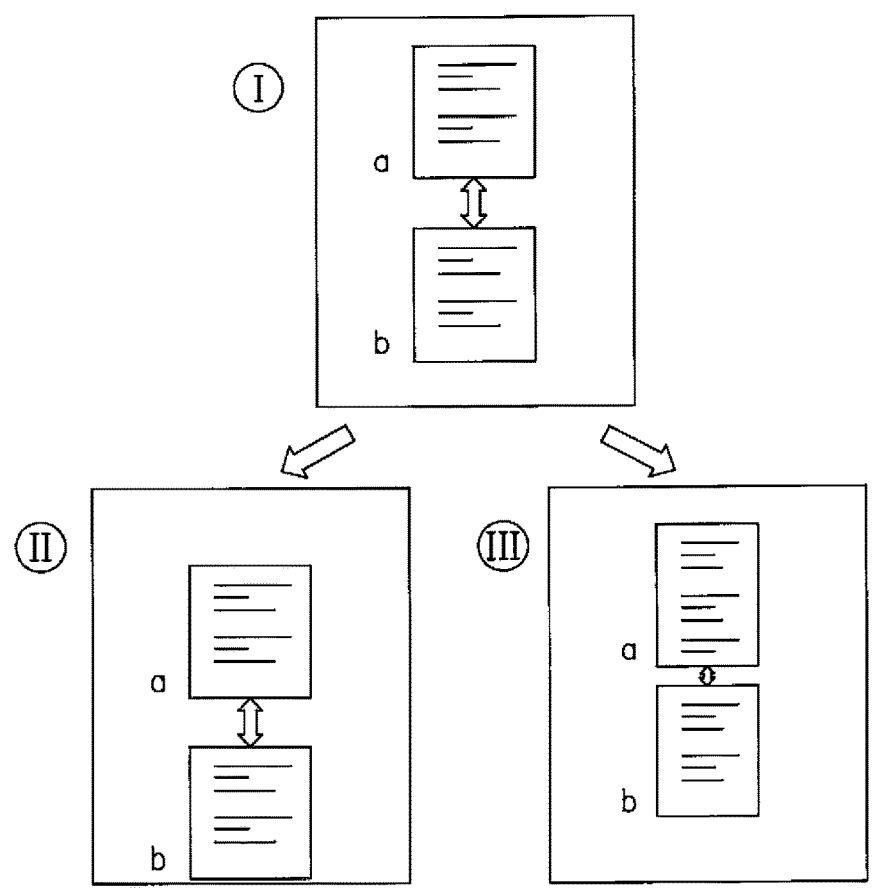
FIG. 16 is a schematic illustration of the differences between firm and flexible anchors, constructed and operative in accordance with the present invention.

Anchors may be firm or flexible. In a firm anchor, the relative distance between linked edges are preserved whenever possible. In a flexible anchor, the distance may have a minimal and maximal relative distance. Reference is now made to FIG. 16 which illustrates firm vs. flexible anchoring. In scenario I, the bottom edge of component [a] is anchored to the top edge of component [b]. If the anchor is firm (scenario II) and component [a] needs to expand downwards, component [b] would also move downwards to preserve the distance between [a] and [b]. If the anchor is flexible (scenario III), component [a] may expand downwards until the minimal distance allowed for the anchor is reached, and only then component [b] would start moving down. An alternative mode of operation for flexible anchors would move component [b] down immediately but would stop when it hits the bottom of the page. In this scenario, component [a] would continue expanding downwards until the minimal distance for the anchor is reached. It will be appreciated that the properties for minimal and maximal relative distance may be set by the designer at the design stage.

Figure 17A:
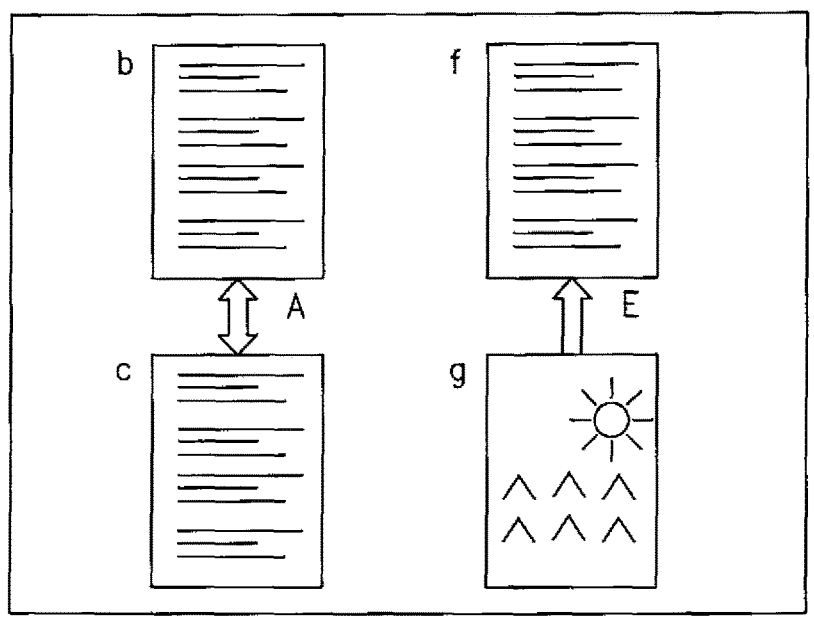
FIGS. 17A and 17B are schematic illustrations of unidirectional vs. bidirectional anchoring and two way anchoring, constructed and operative in accordance with the present invention.

It will be further appreciated that explicit anchors are typically bidirectional so that a change in one anchored component edge can affect the other anchored edge and vice versa. It will be also appreciated that a designer may also specify that anchors are unidirectional as is illustrated in FIG. 17A to which reference is now made. Anchor A connecting components [b] and [c] may be bidirectional, so that when component [b] is moved, component [c] also moves and vice versa. However, if anchor E is unidirectional, linking the bottom edge of component [f] to the top of edge of component [g], if component [f] is moved, component [g] also moves but if component [g] is moved, component [f] remains in position.

Figure 17B:
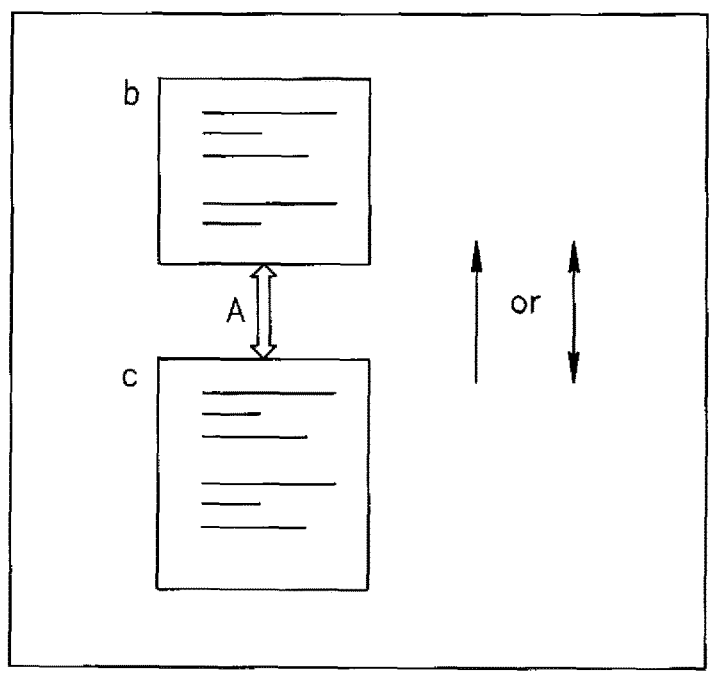

It will also be appreciated that as well as being bidirectional, explicit anchors are typically two-way as illustrated in FIG. 17B to which reference is now made. Component [b] when moved downwards may cause component [c] to move down and when component [c] is moved upwards, component [b] may move upwards accordingly. Alternatively, the anchor may be one-way in that moving component [b] downwards may move component [c] downwards, but moving component [b] upwards would not move component [c] upwards. It will be appreciated that both properties (uni/bi-directional and one/two way) are orthogonal and can be set independently of each other.

As discussed hereinabove, anchors may be either explicit or automatic. Dynamic layout editor 70 may perform automatic anchoring when it detects a situation under which components are likely to be related, and that their spatial relationship should be preserved to a certain extent when one of them is moved (for example, to prevent one from occluding the other). In this way, dynamic layout editor 70 attempts to determine the intent of the designer, and save the work required to create explicit anchors or to move the components manually.

It will be appreciated that dynamic layout editor 70 may implement a number of automatic anchoring rules which may specify the situations under which automatic anchors are created or discarded, subject to certain dynamic layout base parameters and their effect. These rules are described in more detail herein below. It will be further appreciated that the description below details the creation of firm automatic anchors. However, layout editor 70 may also implement rules under which flexible automatic anchors may be created, complete with specific minimal and maximal distance specification for such anchors as described above. In such cases, the flexible anchor parameters may be pre-configured, or be based on the geometrical properties of the component it is connected to.

Figure 18:
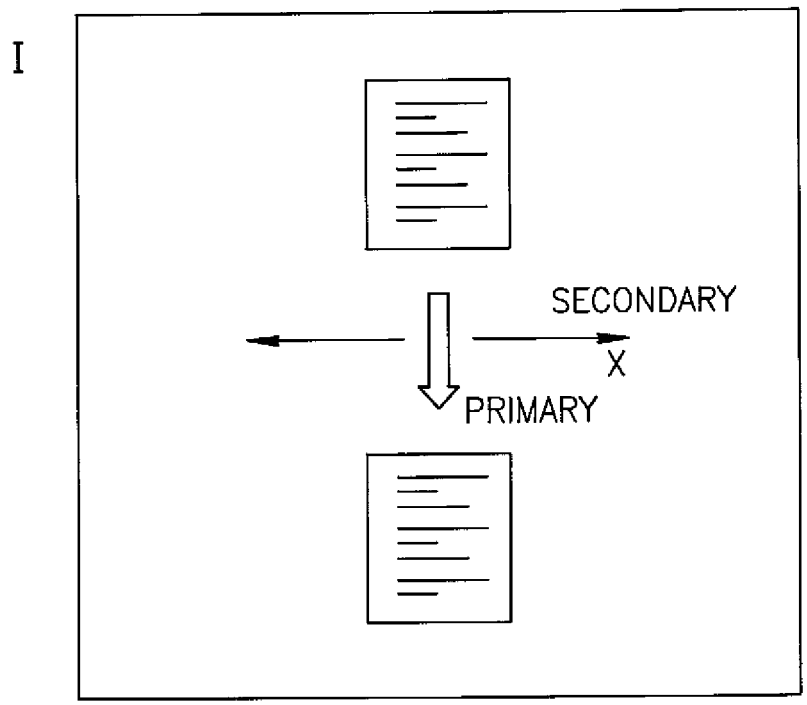
FIG. 18 is a schematic illustration of the use of different primary directions and secondary axes, constructed and operative in accordance with the present invention.
Figure 18:
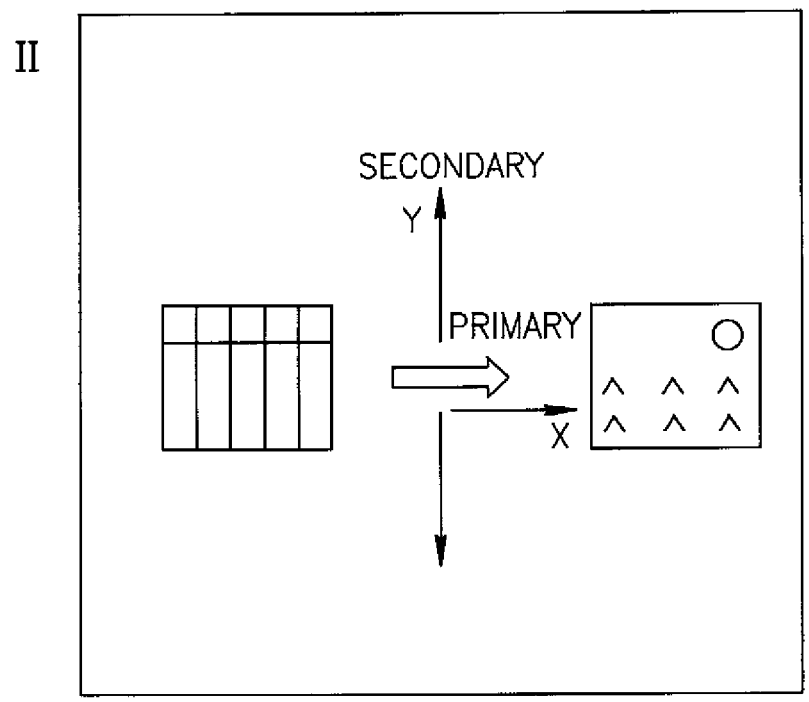

It will be further appreciated that the choice of a primary direction for any dynamic layout operation also defines a secondary axis, which is the axis (and the two directions) perpendicular to the primary direction. If the primary direction is up or down, the secondary axis is the horizontal one (X axis). If the primary direction is left or right, the secondary axis is the vertical one (Y axis)—as illustrated in FIG. 18 to which reference is now made.

In order for dynamic layout editor 70 to determine if an automatic anchor exists between the parallel edges of two components, a series of conditions related to the proximity and/or intersection of the two components may be evaluated—both vertically and horizontally. These conditions are based on testing the inter-component distance or the intersection distance against user-defined minimum and maximum parameters, for a total of 8 different dynamic layout base parameters. The permutations are [primary or secondary]*[proximity or intersection]*[min or max].

Figure 19:
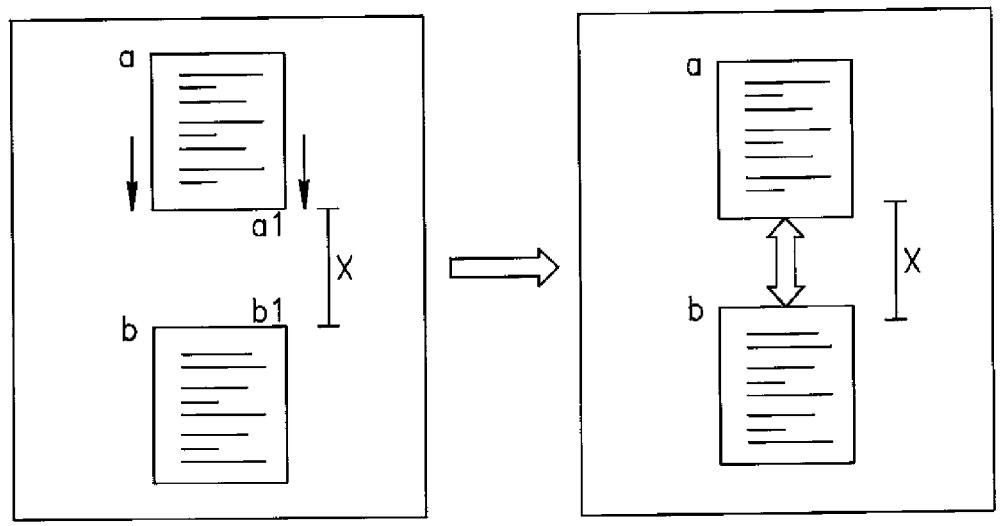
FIG. 19 is a schematic illustration of the creation of anchors when the primary-distance-max parameter has been reached, constructed and operative in accordance with the present invention.

For example, dynamic layout editor 70 may require any of the following conditions for an automatic anchor to be created. In all the examples discussed below, the primary direction is considered to be downwards. dynamic layout editor 70 may create an automatic anchor from the bottom edge of a component [a] (a1) and the top edge of a component [b] (b1) as illustrated in FIG. 19 to which reference is now made. If a1 is located above b1 and the distance between these two edges is greater than the predefined primary-distance-max parameter X, it is possible that component [a] may initially be too high above component [b] to be automatically anchored to component [b]. However, as component [a] moves down or grows down (e.g., manually or due to content change), the distance between components [a] and [b] becomes small enough so they may become anchored.

Figure 20:
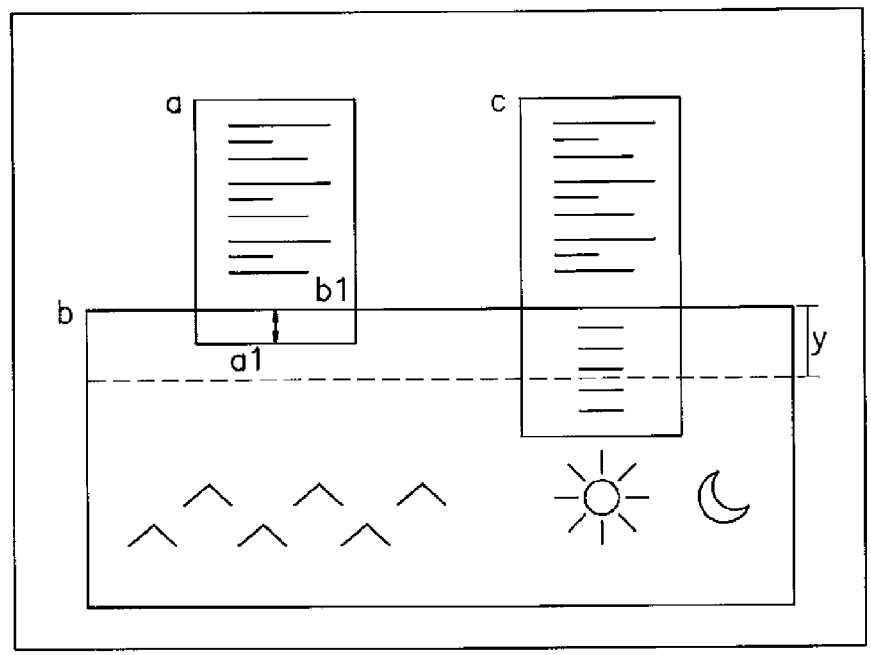
FIG. 20 is a schematic illustration of the use of the primary-intersect-max dynamic layout basic parameter, constructed and operative in accordance with the present invention.

Dynamic layout editor 70 may also create an automatic anchor if the distance between the bottom edge a1 of component [a] and the top edge b1 of component [b] if a1 is below b1 (i.e. the bottom of component [a] intersects with the top of component [b]) as is illustrated in FIG. 20 to which reference is now made. If the intersection distance is larger than the primary-intersect-max parameter y, component [b] and component [c] are not automatically anchored since the overlap is too large (greater than y).

Figure 21:
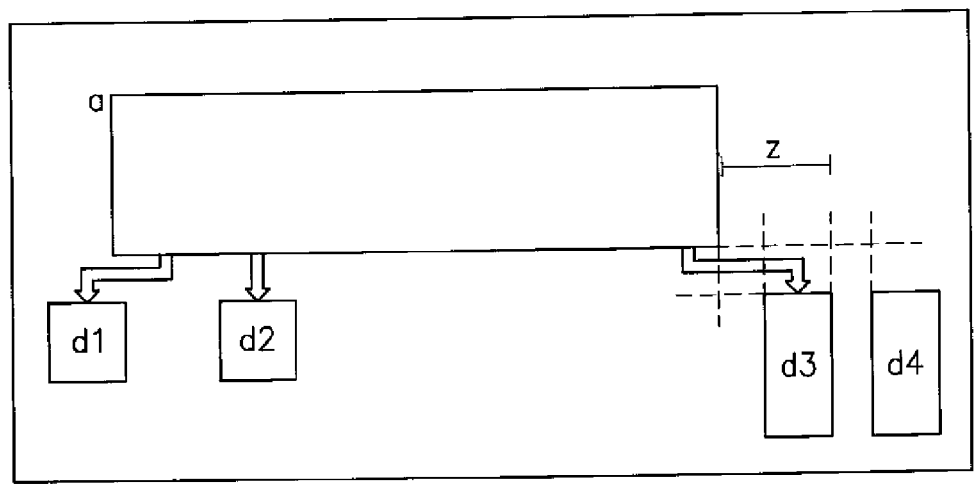
FIG. 21 is a schematic illustration of the use of the secondary-distance-max dynamic layout basic parameter, constructed and operative in accordance with the present invention.

Dynamic layout editor 70 may also create an automatic anchor when the horizontal overlap or distance between potentially anchored components meets a further condition in addition to that of the vertical distance or intersection. An example of this is illustrated in FIG. 21 to which reference is now made. If, component [a] is sufficiently close (in the vertical dimension) to components [d1], [d2], [d3] and [d4], component [a] may expand and intersect (horizontally) with components [d1] and [d2]. Component [a] may also be sufficiently close to (horizontally) component [d3] to form an anchor (i.e. the horizontal distance between the closest vertical edges of component [a] and component [d3] is less than the secondary-distance-max parameter Z). However, component [d4] may not be sufficiently close enough (horizontally) to component [a] and their horizontal distance may be greater than the secondary-distance-max parameter Z. Thus component [a] may be automatically anchored to components [d1], [d2] and [d3] but not to [d4].

It will be appreciated that comparison against parameters which are not implemented or specified (as part of the dynamic layout base parameter set) is not performed. For example, if a minimal secondary axis intersection distance [x] is implemented, but no matching maximal intersection distance is implemented, then any amount of intersection greater than or equal to [x] would satisfy this dynamic layout basic parameter condition.

It will also be appreciated that dynamic layout base parameter sets may also include [0 to infinity] ranges. These are used, for example, to test whether a component [a] is higher than a component [b] and intersects it and whether size of the intersection region between components [a] and [b] is relevant to the systems' automatic anchoring decisions. In such a scenario, a range [0 to infinity] may be defined for the primary intersects [min, max] dynamic layout basic parameter pair.

It will also be appreciated, that the parameters may be combined using Boolean conditions or any other applicable conditions (such as a weighted combination) when dynamic layout editor 70 checks for an automatic anchor creation between component [a] and component [b].

For example, if components [a] and [b] are disjointed along the primary direction, a check is made to see whether their distance is in the relevant [min, max] range.

If components [a] and [b] intersect along the primary direction a check is made to see whether their intersection distance is in the relevant [min, max] range.

If components [a] and [b] are disjointed along the secondary axis (in either direction), check that their distance is in the relevant [min, max] range.

If [a] and [b] intersect along the secondary axis, a check is made to see whether their intersection distance is in the relevant [min, max] range.

Therefore, to create an anchor from component [a] to component [b], the two components have to be correctly positioned both vertically and horizontally. It will be appreciated that values for each of the dynamic layout base parameters may be determined using any combination of the following methods: using a general system parameter; using an override value for the specific web site or application being edited; using an override value for the specific component type of each of the two components being checked (e.g. leave a large space around a picture component as compared to a text component); using an override value for the specific screen being designed and using an override value for the specific container in which the links are being created;

It will be appreciated that the dynamic layout basic parameter values may be defined by the various automatic anchoring rules (described in more detail herein below). It will also be appreciated that the system may specify general dynamic layout basic parameter values to be used by all automatic anchoring rules, or as separate set of dynamic layout basic parameter values for each automatic anchoring rule.

It will be further appreciated that the automatic anchoring rules may also require a specific order between the components along the primary direction. For the sake of illustration, a particular rule may require that component [a] be above (either disjoint from or intersecting with) component [b]. Such an order condition will be tested in addition to the dynamic layout basic parameter conditions.

Furthermore, the actual dynamic layout basic parameter values may also be specified using any combination of the following methods:

Using Absolute Pixel Values.

Using a pixel value which is adjusted relative to the size of display device displaying the application, so if (for example), an application is scaled down 20% due to a display screen having a lower resolution, the threshold values are also scaled down by 20%.

Using a pixel value which is adjusted relative to the sizes of the two components being anchored—so if one of the components is enlarged, the required anchor distance would grow proportionally. The dynamic layout basic parameter value may be specified using the minimal, maximal or average size of the components involved.

Figure 22:
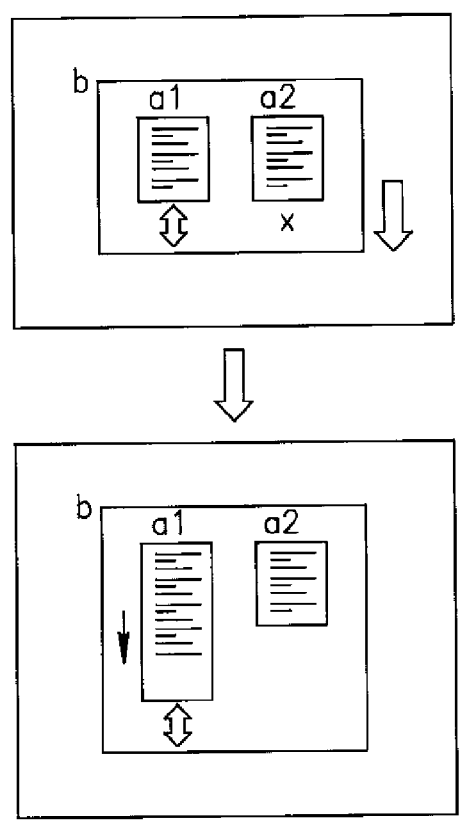
FIG. 22 is a schematic illustration of the implementation of automatic anchoring gate conditions, constructed and operative in accordance with the present invention.

It will also be appreciated that automatic anchoring gate conditions may be implemented as part of the dynamic layout basic parameter conditions. These are per-component/per-edge attributes for each of the implemented automatic anchoring rules which specify if a given rule would be applied to a given component edge or not. For example, as is illustrated in FIG. 22 to which reference is now made, an automatic anchor may be created between the lower edge of components [a1] and [a2] and the lower edge of the containing container [b]. However, the gate condition for component [a1] may specify that such an automatic anchor should be created, while the gate condition for component [a2] may specify that an automatic anchor should not be created. Therefore, in this scenario when the bottom of container [b] moves down, component [a1] may move or expand down, while component [a2] is not affected.

Figure 23:
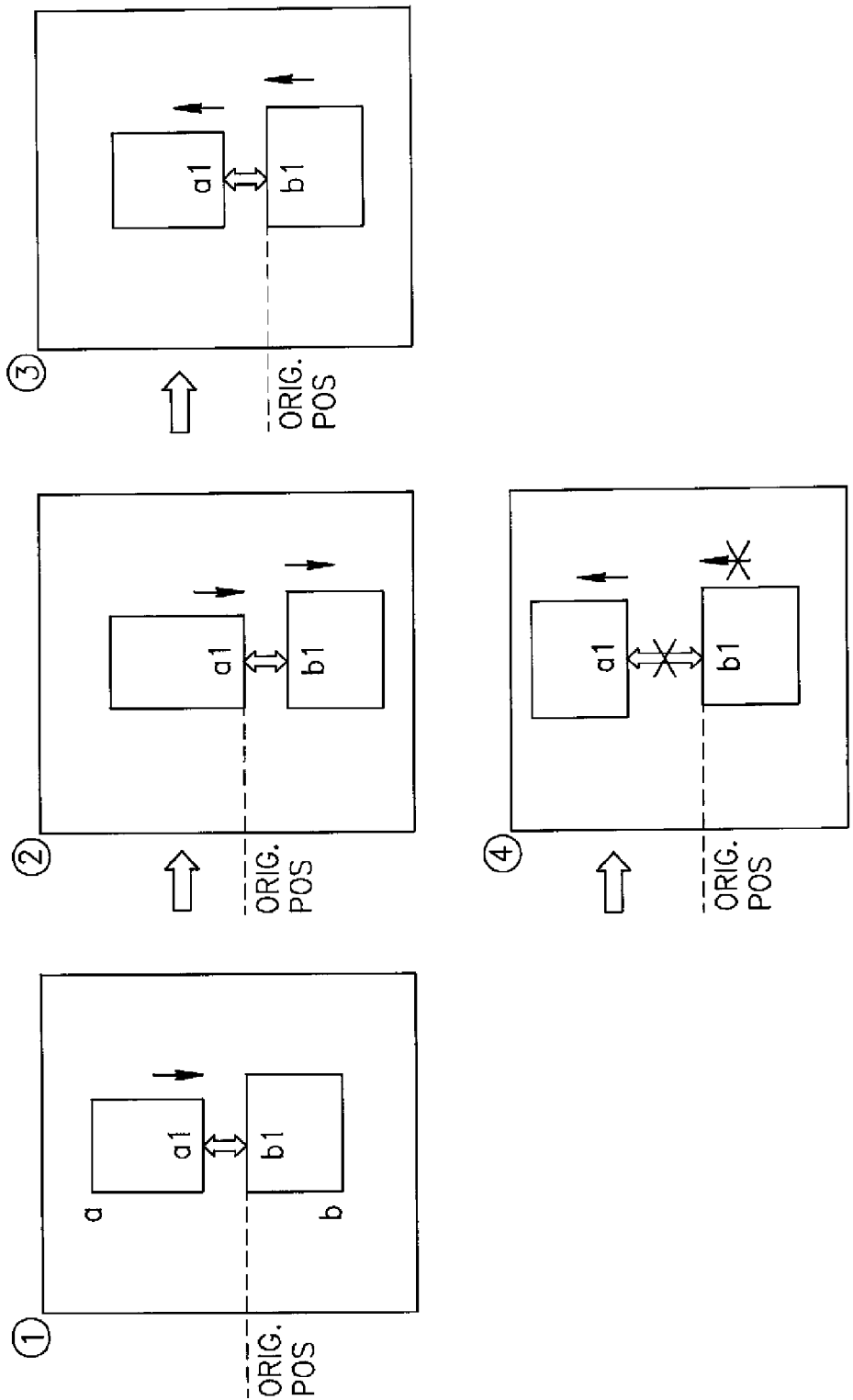
FIG. 23 is a schematic illustration of the automatic anchoring of component edges, constructed and operative in accordance with the present invention.

Reference is now made to FIG. 23 which illustrates the different scenarios of what happens once component edges a1 and b1 become automatically anchored. Any further movement down or up of edge a1 may move the edge b1 as well. This is subject to the limitations of the original position as described herein above, so that if component [b] is moved downwards (for example) due to component [a] pushing it down, and then was pulled back up when component [a] moved up again, component [b] would not move further up once it has returned to its original position, even if component [a] moved up above its original position. In such a case, since the distance between the lower edge of component [a] and the upper edge of component [b] exceeds the threshold X for the existence of automatic anchor, the anchor would be broken.

Figure 24:
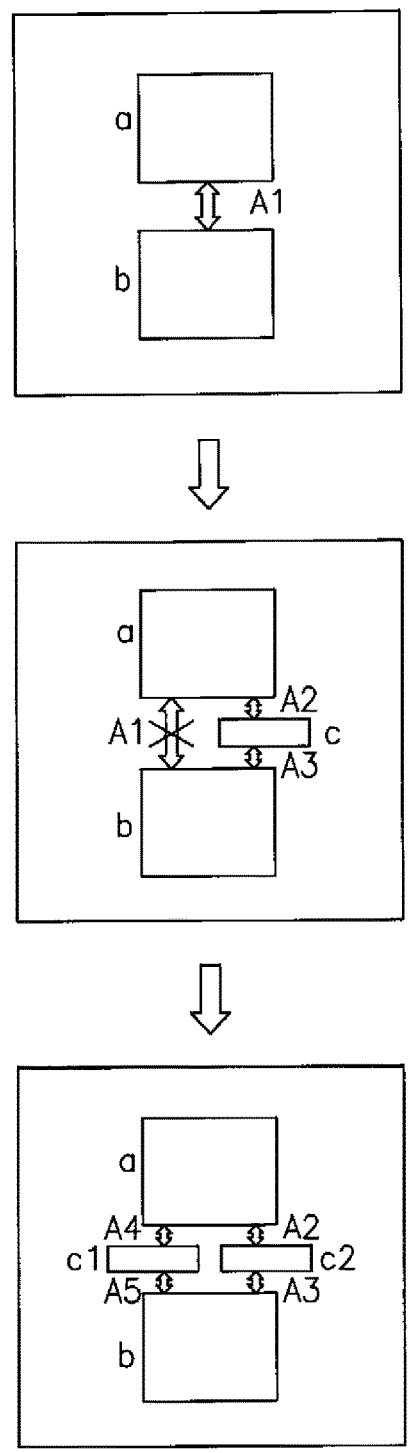
FIG. 24 is a schematic illustration of the breaking of an automatic anchor due to an interfering component, constructed and operative in accordance with the present invention.

Automatic anchors may also be broken when a third component is placed between the two anchored components. For example as is illustrated in FIG. 24 to which reference is now made, in which components [a] and [b] are automatically anchored by anchor A1. When an additional component [c] is placed between them, the direct anchor A1 between components [a] and [b] is broken. It will be appreciated that the system would typically (in such a case) create automatic anchors A2 and A3 between components [a] and [c] and between components [c] and [b]. The break may occur once component [c] is "sufficiently inside" so to satisfy the dynamic layout base parameters conditions between components [a] and [c], or between components [c] and [b]. This way, a situation is avoided in which anchors A1, A2 and A3 co-exist. However, it does allow for a situation in which anchors A2, A3, A4 and A5 can co-exist.

It will also be appreciated that dynamic layout editor 70 may also support semi-automatic anchoring. The pertinent visual design system may detect situations in which an anchor is likely to be needed between two or more component edges in an area where no automatic anchor has been designated. In such cases, the system may suggest the possible anchors to the designer, and the designer can select using an appropriate interface whether to confirm the suggestion (thereby creating an anchor) or not.

Figure 25:
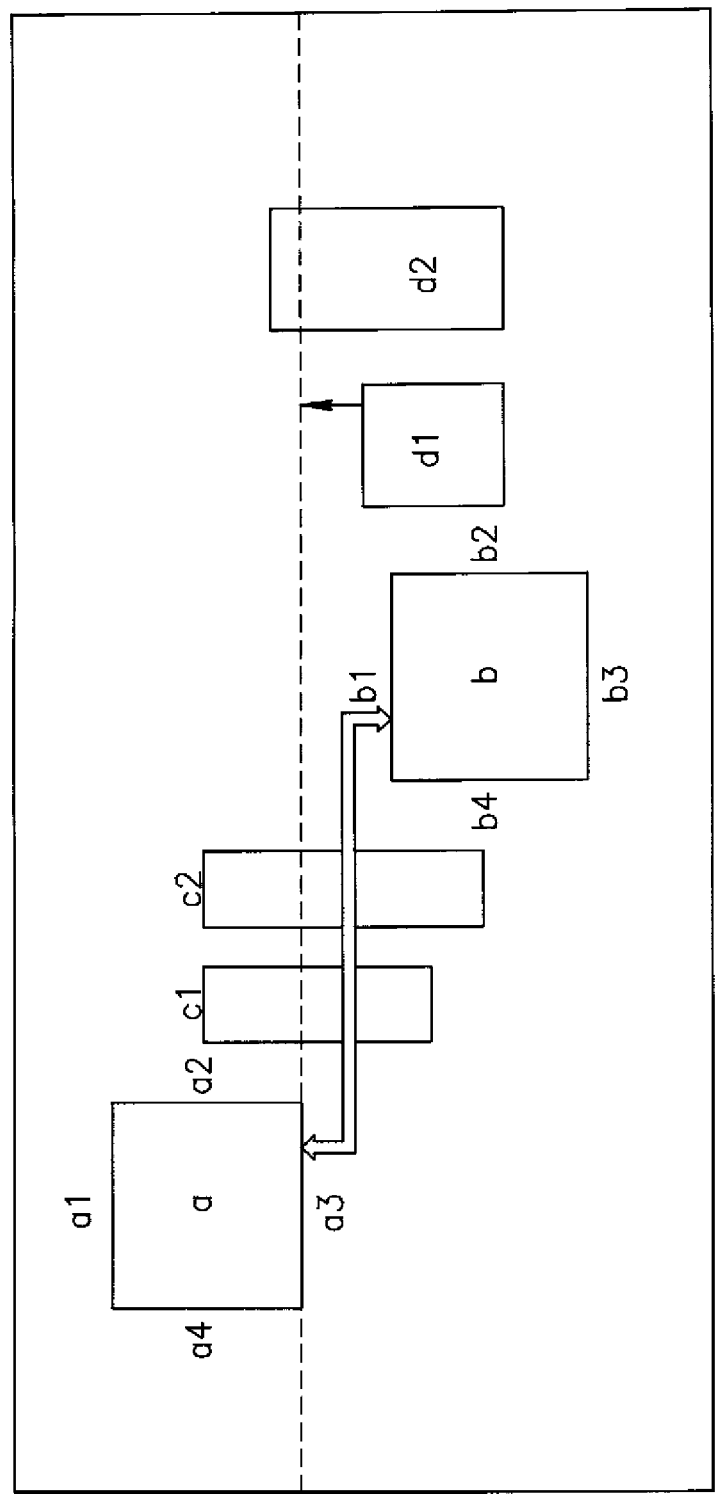
FIG. 25 is a schematic illustration of semi-automatic anchor creation, constructed and operative in accordance with the present invention.

For example, system 100 may suggest that whenever parallel edges of two components lay on the same line, or are sufficiently close to the same line, that the designer confirms the creation of an explicit link between these two parallel edges as is illustrated in FIG. 25 to which reference is now made. As is shown, edges a3 and b4 are sufficiently close vertically (their distance is smaller than a given threshold) so that system 100 suggests that an anchor be created between them. It will be appreciated that additional factors may be taken into account such as: the horizontal distance between components [a] and [b]; the existence of additional components ([c1], [c2]) between [a] and [b] (horizontally) which intersect the common horizontal line and the existence of additional components ([d1], [d2]) whose edges lay on the same line or close to it and the length of the component edge a3 and b3 which are aligned along the line. The created anchor may still be marked as a semi-automatically created anchor and the conditions under which it was created may be stored in the stored dynamic layout information. The anchor remains defined as long as these conditions hold true, and would be broken when the conditions under which it was created are no longer in force.

Figure 26:
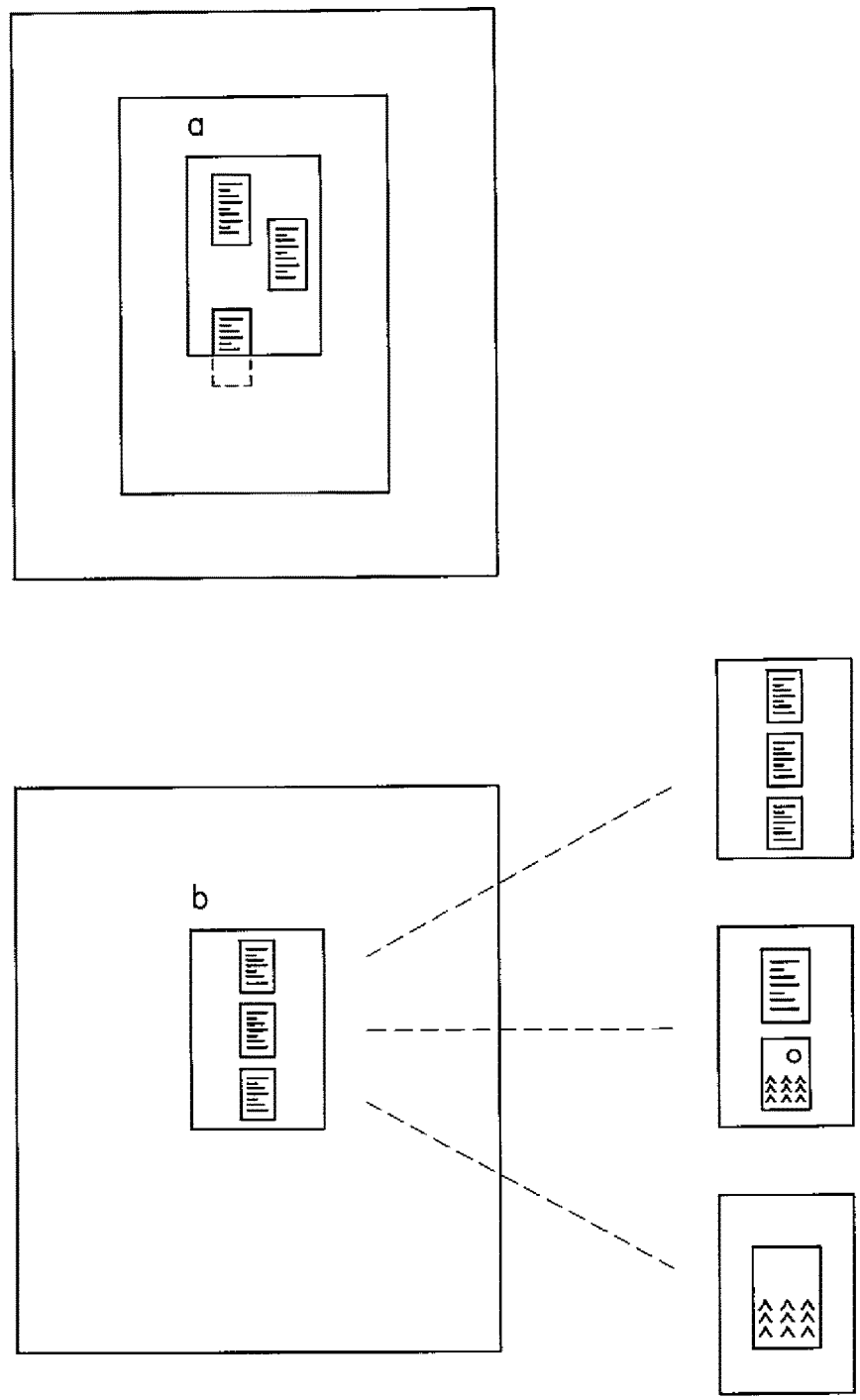
FIG. 26 is a schematic illustration of single page and multi-page containers; constructed and operative in accordance with the present invention.

It will also be appreciated that system 100 may implement a hierarchical component structure, in which some components are containers containing other components or sub-containers. It will be further appreciated that containers may be classed as single page containers or multi page containers. Reference is now made to FIG. 26, which illustrates single page and multi-page containers. As is shown, in single page container [a], all of the contained components are displayed when the container is visible, subject to clipping by the container boundaries. In multi-page container [b], the container components may be placed on multiple underlying areas, all of which belong (logically) to container [b], but of which one component only is displayed at any given time [b]. It is also possible for a multi-page container to display a number of the underlying areas at the same time, e.g. in a gallery-style arrangement. In such a system, components may be arranged as a set of tree structures, in which the roots of the trees are the separate application pages, and nodes of the trees are atomic components, single page containers and the separate contained areas of multi-page containers. Each component or container may be considered to have a single recognized parent node.

It will be appreciated that in such a layout, anchors (explicit, automatic or otherwise) can only be made between a component and its direct parent; between a container component and one of its descendants (in any of the contained areas in multi-page containers) or between two peer components which are both direct descendants of the same node—either the same application page/container or the same area in a multi-page container.

Figure 27:
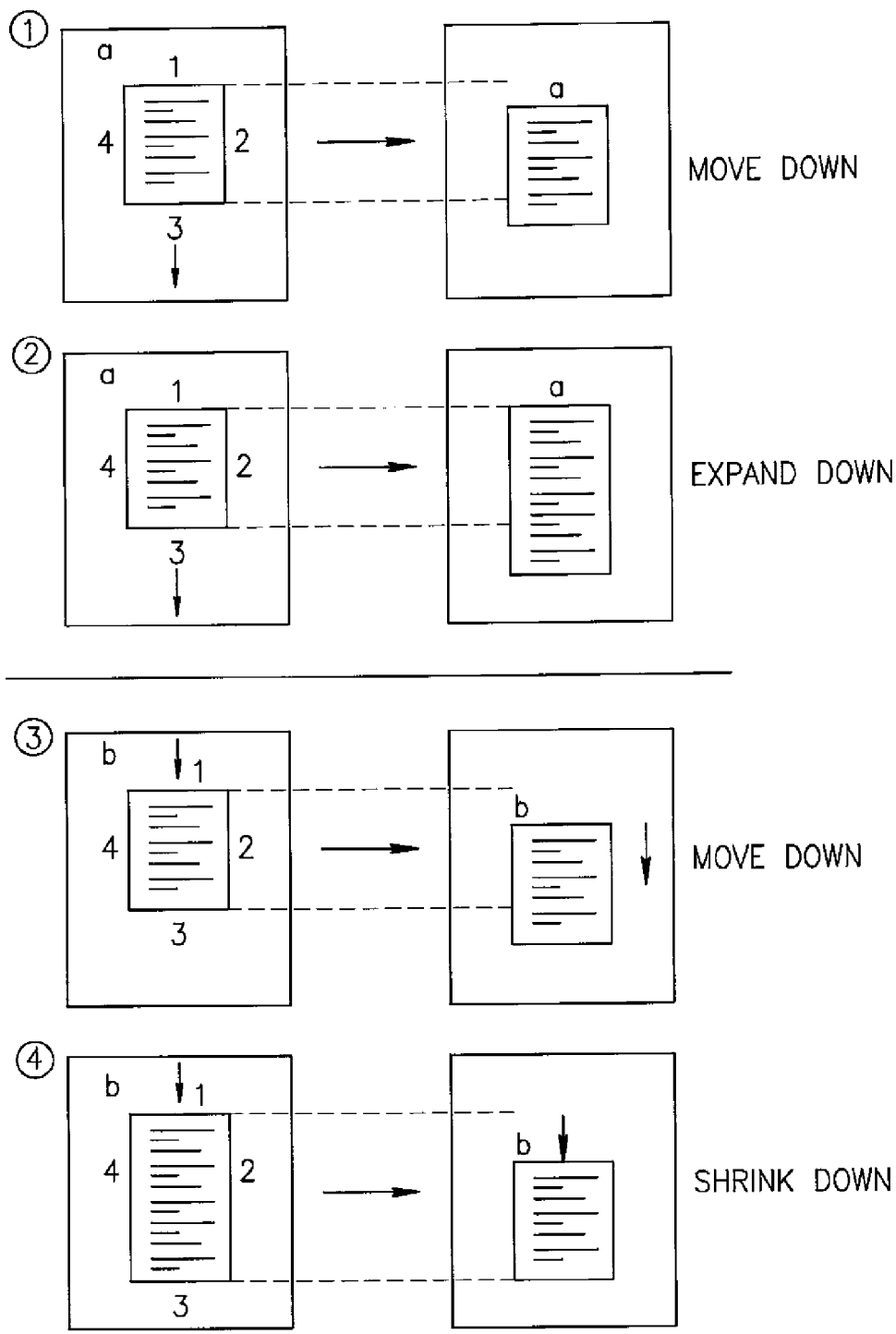
FIG. 27 is a schematic illustration of a comparison of dynamic layout effects of moving and resizing; constructed and operative in accordance with the present invention.

It will also be appreciated that when a dynamic layout event occurs, the anchored edge of the affected element (e.g. component, content, container etc.) has to move. Reference is now made to FIG. 27 which illustrates such a scenario where dynamic layout is implemented. For example, due to a dynamic layout event, edge 3 of component [a] needs to move downwards. If edge 3 is the lower edge of a given component, there are two possible ways to do this: by moving the entire component down (keeping its vertical size intact) (scenario 1) or by moving just the edge down, expanding the entire component in the vertical direction (scenario 2). If the edge is the upper edge 1 of component [b], there are again two possible ways to do this: by moving the entire component down (keeping its vertical size intact) (scenario 3) or by moving just the edge down, shrinking the entire component in the vertical direction (scenario 4).

It will be further appreciated that if the other horizontal edge of the same component is directly anchored to a framework element, the choice of direction is forced by that anchor. Otherwise, there are multiple options. For explicit anchors, dynamic layout editor 70 may provide a graphical user interface for the user to specify, for each explicit anchor, the direction for each anchor (since anchors may be bidirectional) and whether the anchor would move the affected component upon a dynamic layout event, or resize it instead.

For automatic anchors, this method is typically inappropriate as such anchors may be constantly created and removed. It will be appreciated that dynamic layout editor 70 may provide a default setting which allows the designer to specify which action should be taken (for both types of edges) in the case of automatic anchors. This may be specified at the application/web site level, with possible overrides at the application page, container and component level.

It will also be appreciated that for some types of automatic anchors, a single option may be available—typically a resize (rather than move). In particular, in all automatic anchor situations in which a component [a] affects the container component [b] which logically contains [a], the effect must always be a resize and not a move—since a contained component cannot move the container that contains it.

Figure 28:
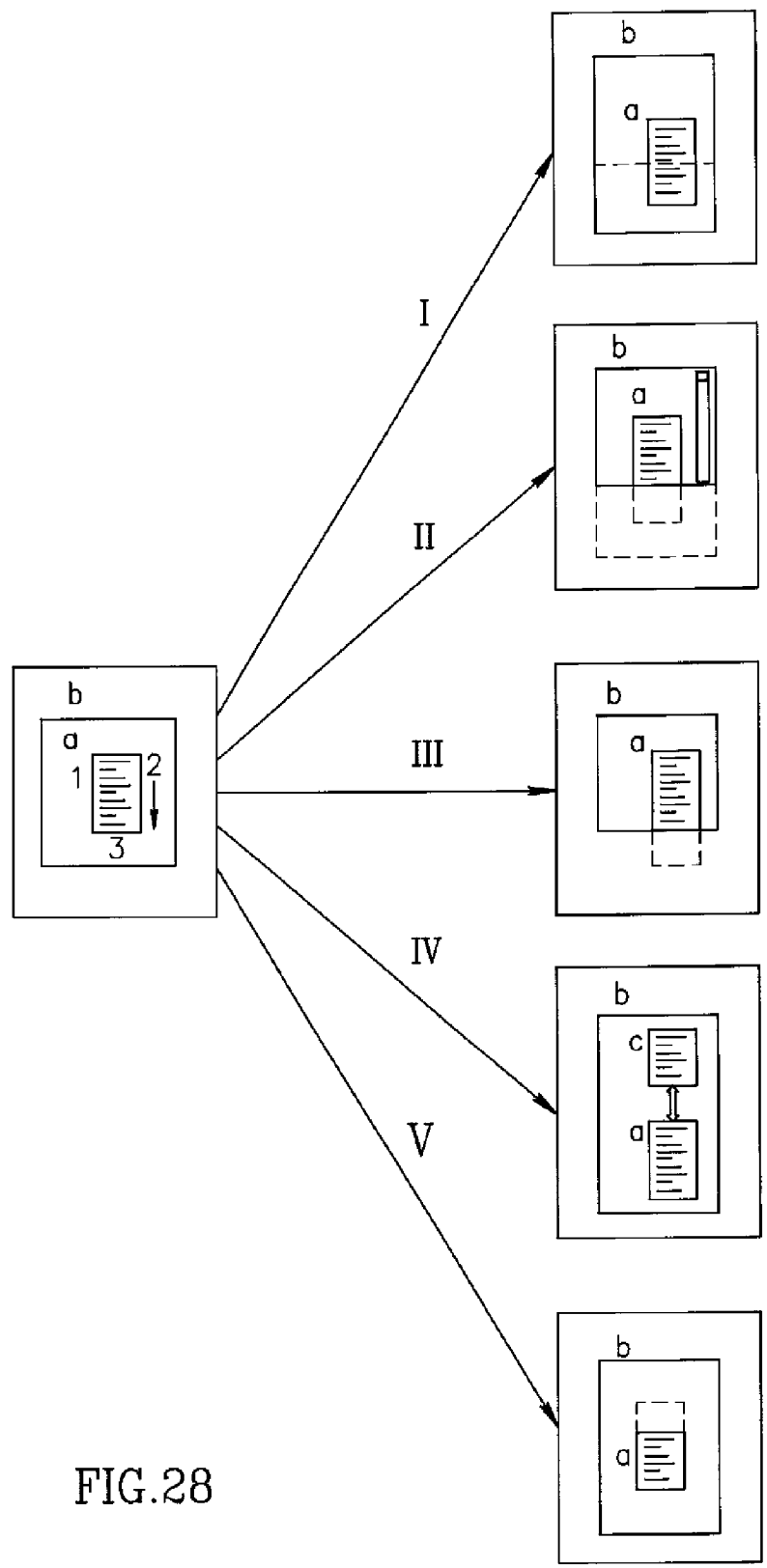
FIG. 28 is a schematic illustration of the changes to a behavior set for a given component due to dynamic layout; constructed and operative in accordance with the present invention.

It will also be appreciated that some dynamic layout changes may require a component to shrink, e.g. when its bottom edge moves up due to an explicit anchor to another edge which was moved up. It may be possible to define a minimal size for each component or component type in order to prevent such components from shrinking below their minimal size. Reference is now made to FIG. 28 which illustrates how the behavior set for a given component [a] may change due to dynamic layout (moving or expanding down) when edge 3 of component [a] reaches the bottom of container [b]. It will be appreciated that the distance between bottom edge 3 of component [a] and the bottom edge of container [b] may be below a certain pre-specified threshold. Container [b] may be an actual container or may be the edge of the screen. In such a case, the following options (or combinations thereof) may be implemented:

In scenario I, container [b] or the screen may be extended downwards. In scenario II, container [b] or the screen may be extended logically but not physically and therefore retaining the existing position and size of container [b]. The discrepancy between the physical and logical dimension of container [b] is resolved by making container [b] a scrollable object, with a vertical scroll bar which allows viewing of the non-displayed portions of container [b]. In scenario III, component [a] may continue moving or expanding down, but part of the component may become clipped (and thus hidden) by the bottom of container [b]. In scenario IV, component [a] may stop moving or expanding down—which may affect additional components as well. For example, if component [a] was moving downwards (e.g. due to a component [c] pushing it from above), component [a] may stop moving and thereby cause [c] to stop moving as well, or alternatively the distance between [c] and [a] may be shrunk (depending on the type of anchor D between them). It will also be appreciated that if component [a] expands downwards (e.g. due to editing text content inside component [a]), the content inside component [a] might be affected in a variety of ways, including (but not limited to): being displayed using different fonts and being displayed with scroll bars (which allow scrolling over the content). In scenario V, component [a] may start to shrink instead of just moving downwards.

It will be appreciated as discussed hereinabove, that the above mentioned examples may be classified into four main automatic anchoring rules.

The first rule is between content and a containing component. An automatic anchor may be defined between every container and its content. Under this rule, the size of a component which contains variable content may change as the content changes. This may occur due to content changes made by a designer or an end-user, changes in content initiated by the application itself while running and changes in content caused by dynamic content. System 100 may define a minimal distance threshold between the content and the component frame so that content changes only affect the lower edge of the component once the lower edge of the content is within a minimal distance from the lower edge of the container.

The second rule may be between a component and a peer component in a primary direction. An automatic anchor may be defined between parallel edges of adjacent components along the primary direction. If the primary direction is down, then an automatic anchor may be created between the bottom edge of a component [a] and the top edge of a component [b] when the dynamic layout basic parameter conditions are satisfied.

Figure 29A:
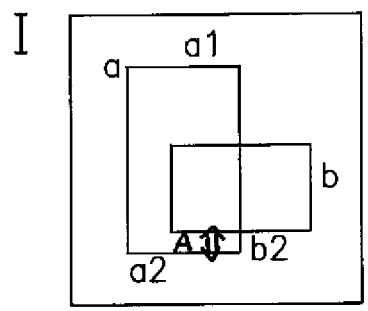
FIGS. 29A, 29B and 29C are schematic illustrations of an automatic anchoring rule between the bottom edges of components which are near to each other, constructed and operative in accordance with the present invention.
Figure 29A:
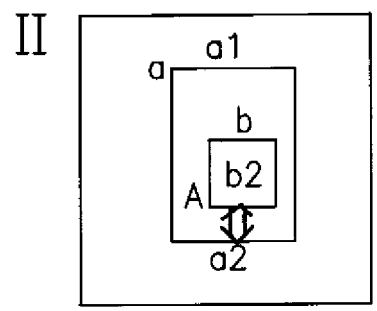
Figure 29A:
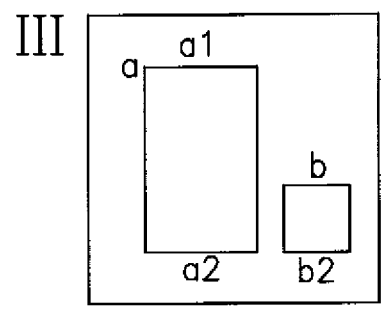
Figure 29A:
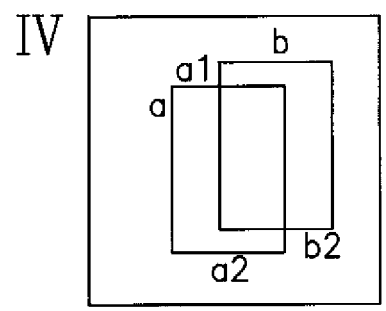
Figure 29B:
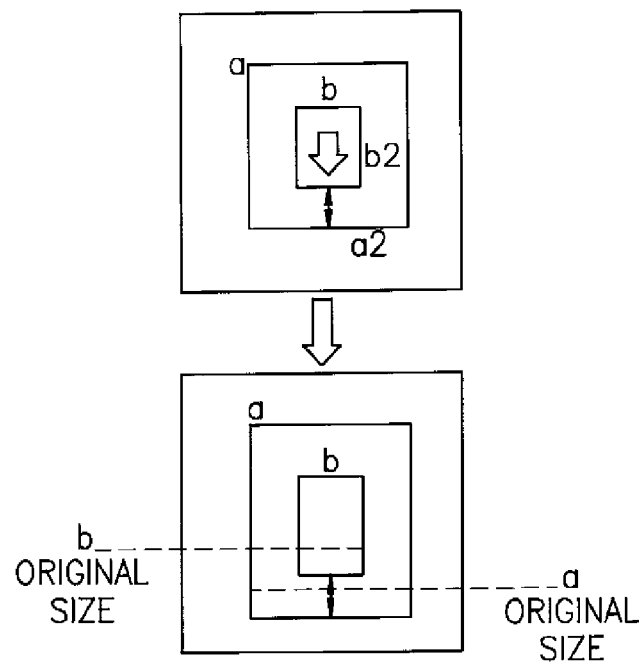
Figure 29B:
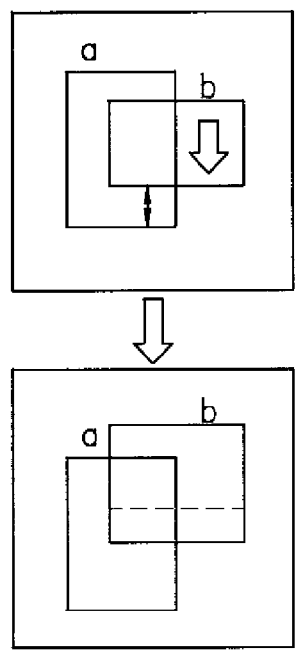

The third rule may be between the bottom of component [a] and the bottom of component [b]. Dynamic layout editor 70 may automatically create an anchor between bottom edges which are near to each other horizontally, or intersect each other in the horizontal direction as is illustrated in FIG. 29A to which reference is now made. It will be appreciated that under this rule and using typical dynamic layout base parameters, dynamic layout editor 70 would create an automatic anchor A between the bottom edges a2 and b2 of components [a] and [b] (scenario I) when the following conditions are met: edge b2 is inside component [a], edge b2 is below the top edge a1 and above the bottom edge a2 (scenario II), component [b] is either completely contained vertically in component [a] or just intersects vertically and components [a] and [b] are sufficiently close enough to each other to intersect horizontally (scenario III). Components [a] and [b] may be peer components or component [a] may be a container which logically contains component [b] (scenario IV) There must be no other component between edges a2 and b2. In this scenario the anchor may be bi-directional or unidirectional from edge b2 to edge a2. Therefore, when component [b] moves or expands down (and edge b2 moves downwards), component [a] would also move or expand down (as defined for anchor) i.e. edge b2 pushes edge a2 downwards. When edge b2 moves back upwards, it pulls edge a2 back up again until it teaches its original position as is illustrated in FIG. 29B to which reference is now made.

Figure 29C:
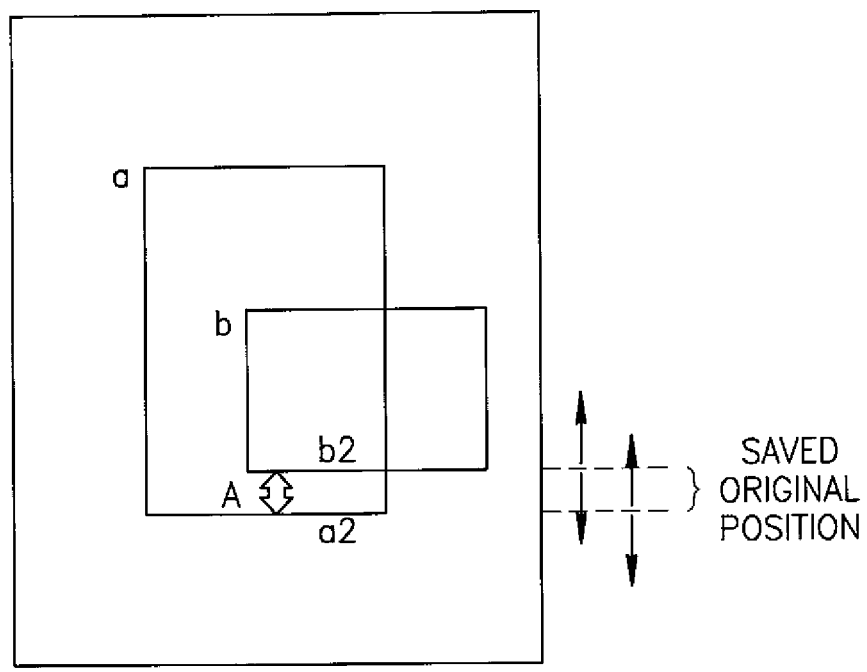

If component [a] logically contains component [b], then moving edge b2 will only resize component [a] (by moving edge a2 up or down as appropriate). It would not move component [a]. This limitation does not apply if components [a] and [b] merely intersect and component [a] does not logically contain [b]. It will be further appreciated that if a bidirectional version of anchor A is implemented, when component [a] moves or expands down, component [b] would also move or expand down (as defined by anchor A) i.e. edge a2 pills edge b2 down. When edge a2 moves back up, it pushes edge b2 until edge a2 reaches its original position as is illustrated in FIG. 29C to which reference is now made.

Figure 30A:
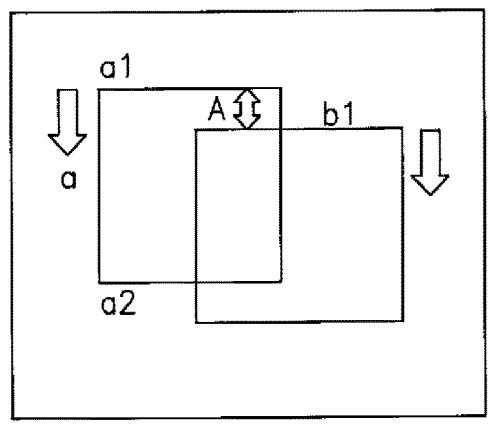
FIGS. 30A and 30B are schematic illustrations of an automatic anchoring rule between the top edges of components which are near to each other, constructed and operative in accordance with the present invention.
Figure 30A:
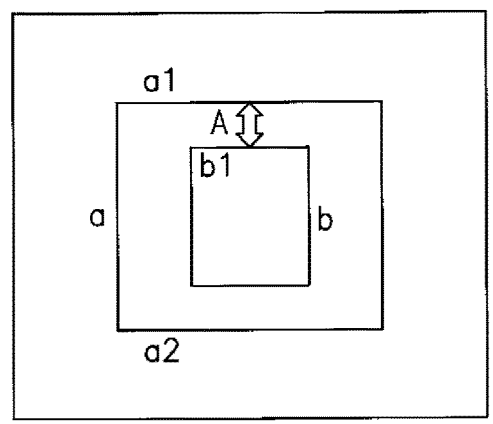
Figure 30B:
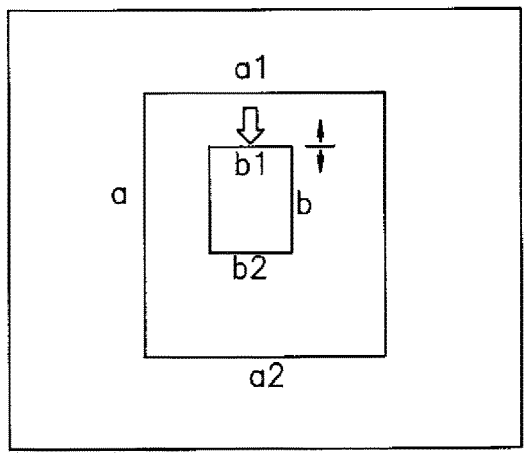

The fourth rule may be between the top of component [a] and the top of component [b]. Dynamic layout editor 70 may create an anchor between the top edges of both components which are near to each other horizontally or intersect each other in the horizontal direction as is illustrated in FIG. 30A to which reference is now made. Under this rule in a typical dynamic layout base parameter setting, dynamic layout editor 70 may create an automatic anchor between the top edges a1 and b1 of two components [a] and [b] if the following conditions are met: edge b1 is inside component [a], edge b1 is below edge a1 and above edge a2 and component [b] is completely contained vertically in component [a] or intersects component [a] vertically. Both components [a] and [b] must be sufficiently close to each other or intersect horizontally. Components [a] and [b] may also be peer components (i.e. inside the same container or page) or [a] may be a container which logically contains [b]. There must be no other component between edges a1 and b1. It will be appreciated that anchor A is unidirectional from edge a1 to edge b1, and is activated when edge a1 moves down, moving edge b1 and therefore component [b] with it. If component [a] is expanded downwards, anchor A is not activated since edge a2 is moved but not edge a1 as is illustrated in FIG. 30B to which reference is now made.

It will be appreciated that dynamic layout editor 70 may apply automatic anchoring rules between more than two component edges if applicable, so that a more complex anchor may be created that connects three or more components.

It will also be appreciated that a flexible anchor may allow the distance between component [a] and container [b] to shrink further until a minimal distance is reached. In this scenario, the anchor may then become fixed so that no further anchor shrinking would be allowed. It will be further appreciated that system 100 may specify a default behavior (selected amongst the scenarios of FIG. 28 whenever applicable and implemented), and may specify an override behavior at the component or container level. It will also be appreciated that although the discussion above refers to edges and components moving down, this is by the way of illustration only and system 100 may implement dynamic layout events which cause edge moves in all four directions.

Figure 31:
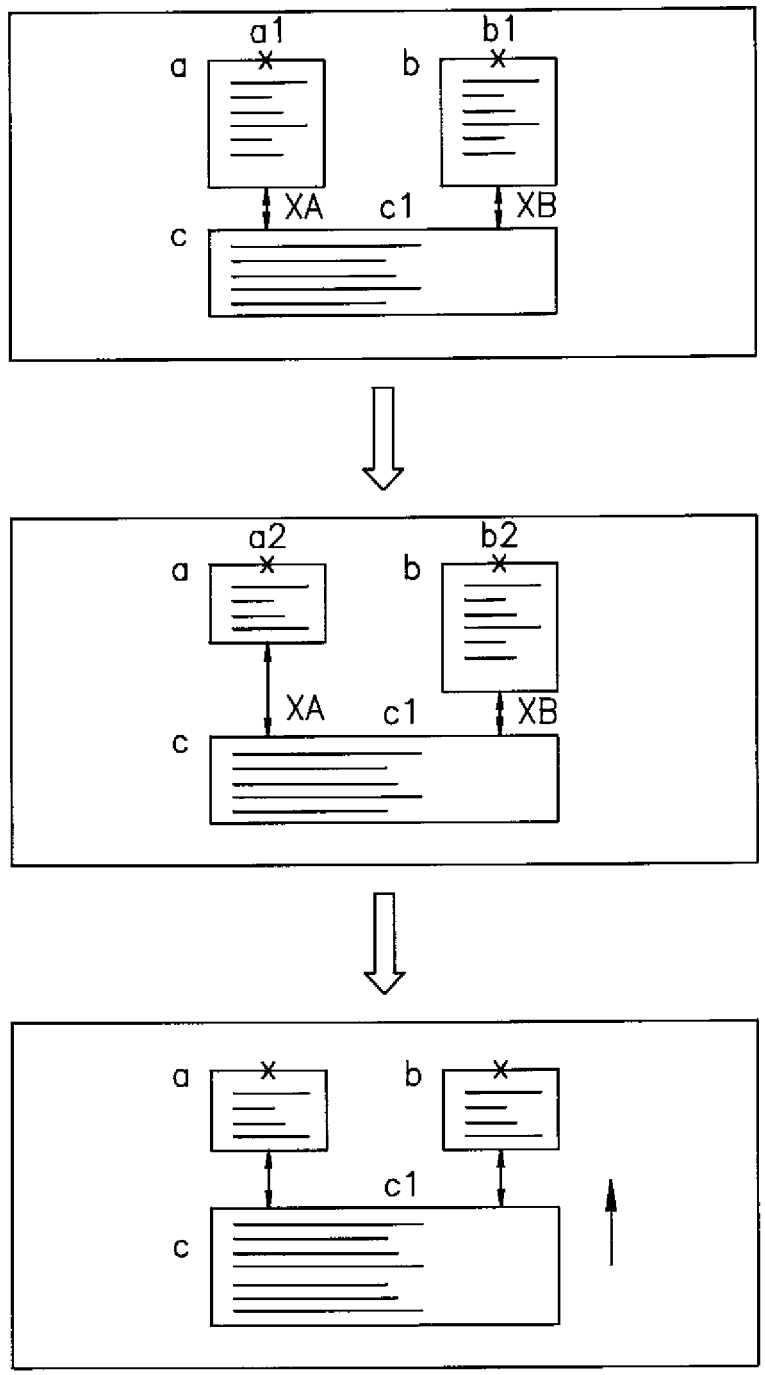
FIG. 31 is a schematic illustration of multiple anchor interaction, constructed and operative in accordance with the present invention.

It will also be appreciated there may be multiple anchors which may dictate different behaviors for a given component when a dynamic layout event occurs as is illustrated in FIG. 31 to which reference is now made. For example components [a] and [b], may be at a 20 pixel distance from component [c], creating an automatic anchor XA between [a] and [c] and another automatic anchor XB between components [b] and [c]. The top edges a1 of component [a] and b1 of component [b] may both be locked in place. It will be appreciated that components [a] and [b] may be text components, each of which may contain a certain amount of multi-line text (and thus their bottom edges would move according to the amount of text contained in them). When the amount of text of inside component [a] is reduced, component [a] may shrink upwards and pull with it the top edge c1 of component [c] (due to automatic anchor XA). However, this move upwards of component [c] may be limited to the minimal allowed distance between edge c1 and the bottom edge b3 of component [b]. A situation might arise in which edge c1 cannot move upwards since it may "stretch" anchor XA above the maximal distance under which it can be created with the dynamic layout basic parameters in place. However, the system may still remember XA as an "overstretched" anchor, rather than breaking it. It also may remember the original distance set for the anchor XA.

It will be further appreciated that if the amount of text inside component [b] is reduced, component [b] would shrink, moving bottom edge b2 upwards. The top edge c1 of component [c] may also move up as much as is possible according to the limitations set by the two anchors XA and XB.

As discussed hereinabove, dynamic layout coordinator 170 may employ rules to evaluate and create automatic anchors, to determine when a dynamic layout trigger has been activated and to execute the dynamic layout changes based on the pertinent triggered dynamic layout events.

Figure 32:
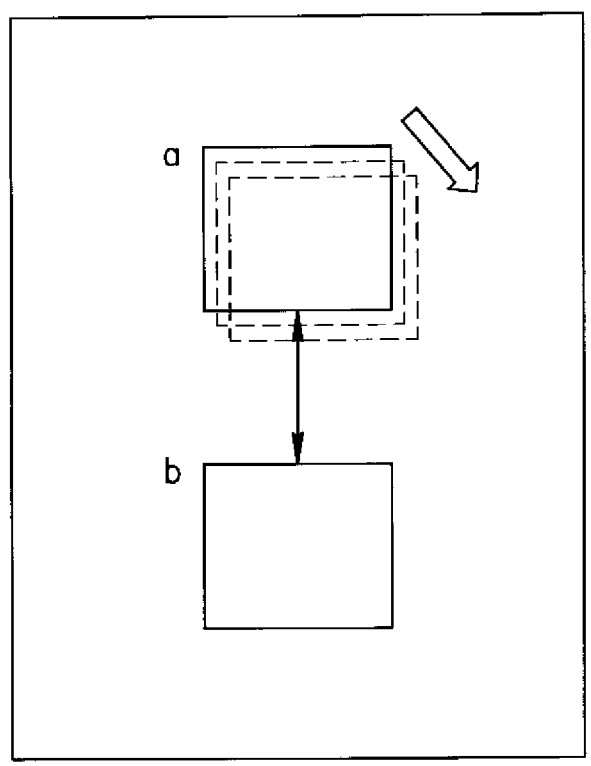
FIG. 32 is a schematic illustration of activation of a dynamic layout algorithm together with an incomplete triggering action, constructed and operative in accordance with the present invention.

It will also be appreciated that these rules may run upon occurrence of any of the possible dynamic layout trigger events described herein above. It will be appreciated that these rules may also run even if triggering action is not completed. Reference is now made to FIG. 32 which illustrates component [a] in the process of moving downwards. A dynamic layout trigger might occur every time the component [a] has moved a few pixels (with the attendant move to component [b]), and before the movement has been completed and before component [b] has reached its new final position.

The rule in this situation may also be applied recursively for each container level inside the application (e.g. to each page separately, and to each container in each page). It may scan all possible anchor relationships—both existing anchors and potential semi-automatic and automatic anchors—and may perform the dynamic layout according to the dynamic layout rules described above, adding, removing and modifying the anchors and modifying component properties as required.

Therefore a server based system may be used to integrate dynamic layout rules across single and multiple clients sharing the same server enabling the efficient moving and resizing of components where necessary and thus improving the website creation and design process.

Glossary

| Term | Definition |
| --- | --- |
| AAR (Automatic Anchoring Rules) | Rules which specify the situations under which automatic anchors are created or discarded. |

-continued

| Term | Definition |
| --- | --- |
| Anchor | A relationship set between two or more parallel lines in the layout. These lines can be component edges, component center lines, or framework element. The anchor specifies a given fixed distance between these lines, or possibly a minimal and/or maximal distance between the lines. |
| Anchor, bidirectional | An anchor in which change in each edge in the anchor sets affects the other edges included in the same anchor set. |
| Anchor, one-way | An anchor in which the affecting edge can move the affected edge in one direction only (i.e. only up or only down). |
| Anchor, unidirectional | An anchor in which change in one edge will affect the other edge, but not vice versa. |
| Anchor, two-way | An anchor in which move in one edge in either direction (up or down) will move the affected edge in the matching direction (up or down). |
| Anchor set | The set of (two or more) edges connected in the same anchor. |
| Application | An edited graphical application, such as web sites, catalogs, presentations, e-shops, flow diagrams, charts etc. Applications consist of pages. |
| Axis, secondary | The axis (and the two directions) perpendicular to the primary direction. |
| Component | A single geometrical element (typically rectangular) inside an application page. A component may be an atomic component or a container component. |
| Component, atomic | Components which cannot be decomposed into sub-components. |
| Component, container | Components which occupy a given screen area and can contain one or more other sub-components. Containers may be single-page or multi-page. |
| Container, multi-page | A container in which components may be placed on multiple underlying areas, all of which belong (logically) to the container, but only one of these areas is displayed at any given time |
| Container, single-page | A container in which all of the contained components are displayed when the container is visible, subject to clipping by the container boundaries. |
| Creation | See application. |
| Direction, primary | The primary direction in which a dynamic layout process operates. Multiple primary directions may be active at the same time. |
| Direction, secondary | One of the two directions on the secondary axis (both perpendicular to the primary direction). |
| DLBP (Dynamic Layout Base Parameters) | The basic set of 8 (2 × 2 × 2) parameters which determine if an automatic anchor should be created between two elements - the min/max value for distance/intersection in the primary/secondary directions between two elements |
| DLBP gate conditions | Per-component/per-edge attributes for each of the implemented automatic anchoring rules, which specify if a given automatic anchoring rule would be applied to a given component edge or not |
| Dynamic layout event | Each triggering of a dynamic layout rule, in which a change in one element has affected one or more elements. |
| Dynamic layout rules | Rules which describes a situation in which an element of the designed application affects another element of the designed application. |
| Dynamic layout trigger | A possible situation under which a pre-planned layout has to be changed (triggering a dynamic layout event). These include, for example:<br>On-line editing of content - including:<br>Actual content modification;<br>Changes to component style;<br>Changes to global style;<br>Changes due to collaborative authoring;<br>Multiple display size/configuration support;<br>Dynamic data support;<br>Explicit end-user originated layout changes, including:<br>End-users changing components' content;<br>End-users changing component size/position;<br>Components with display variants selected by end-user;<br>Application-initiated layout changes; |
| Element | An object participating in the dynamic layout process. It may be a component, a container or the content of a given component. |
| Element, affected | An element affected by the activation of a dynamic layout rule. |
| Element, affecting | An element affecting another element through the activation of a dynamic layout rule. |
| Page | A single viewable page in an application. A page may include any number of components. |
| Positioning, absolute | A system which uses exact (X, Y) positioning for each element relative to the container containing it. |
| Positioning, relative | A system which arranges elements according to a flow or natural order, with the position set for each element based on the position and size of the preceding element. |

-continued

| Term | Definition |
| --- | --- |
| SADL (Server Assisted Dynamic Layout) | A system built so that a number of tasks related to dynamic layout are performed with the assistance of an application-specific server which cooperates with the editing or viewing client. |
| SADL, component level | The services needed to present modified versions of a specific component. |
| SADL, container level | The services performing actual calculation of the layout based on the properties of the collection of components which reside inside a single container. |
| SDLI (Stored Dynamic Layout Information) | An internal data structure which contains the full dynamic layout information and is persistent across editing sessions. Includes, in particular: All anchor information, including anchor type; Anchor creation history and the conditions under which the anchor was created; The original & current position and size for each component affect by dynamic layout; |
| Single Design/Multiple Data Model | A model under which a single common design template is used by multiple applications having different content data. |
| System, anchor-based | A system in which the dynamic layout is defined in terms of anchors set between components and framework elements, as well as between the components themselves. |
| System, constraint-based | A system in which the designer defines dynamic mathematical constraints on the relationships between the components residing on the screen. |
| System, server-based | A system in which the editing is performed by client software tightly coupled with an application-specific server which stores the edited web site. A.K.A. on-line web site building. |
| System, non-server-based | A system in which the web site editing, the staging process and the actual on-line delivery of the created applications are all separate stages. A.K.A. off-line web site building. |
| Visual design system | A system used to edit creations and applications visually. |

Unless specifically stated otherwise, as apparent from the preceding discussions, it is appreciated that, throughout the specification, discussions utilizing terms such as "processing," "computing," "calculating," "determining," or the like, refer to the action and/or processes of a computer, computing system, or similar electronic computing device that manipulates and/or transforms data represented as physical, such as electronic, quantities within the computing system's registers and/or memories into other data similarly represented as physical quantities within the computing system's memories, registers or other such information storage, transmission or display devices.

Embodiments of the present invention may include apparatus for performing the operations herein. This apparatus may be specially constructed for the desired purposes, or it may comprise a general-purpose computer selectively activated or reconfigured by a computer program stored in the computer. Such a computer program may be stored in a computer readable storage medium, such as, but not limited to, any type of disk, including floppy disks, optical disks, magnetic-optical disks, read-only memories (ROMs), compact disc read-only memories (CD-ROMs), random access memories (RAMs), electrically programmable read-only memories (EPROMs), electrically erasable and programmable read only memories (EEPROMs), magnetic or optical cards, Flash memory, or any other type of media suitable for storing electronic instructions and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.)

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A system for dynamically adjusting the layout of components of a website in a website building system according to changes in one or more of the components, the system comprising:
a memory and a processor;
a database storing visual components of said website, wherein said components comprise atomic components and container components containing one or more other components;
an online website editor to enable a user to change said components within said website during an editing session;
a layout manager integrated into said website editor and operative during an editing session to dynamically create at least automatic anchors between parallel edges of affecting and affected components according to associated dynamic layout rules, said rules defining relationships at least between content and a containing component, between a component and a peer component in a primary direction, between bottom edges of said affecting and said affected components, and between top edges of said affecting and said affected components;

a receiver to receive events caused by dynamic layout triggers generated by said online editor related to dynamic changes in at least position, size, content and visual attributes of at least one of said website components; and a coordinator, in response to said events, at least to automatically create or remove anchors between at least two components of said website affected by said dynamic layout triggers, to generate dynamic layout updates for said components according to said associated dynamic layout rules, and to instruct said layout manager to display said components with said dynamic layout updates in said online editor during said editing session.

2. The system according to claim 1 said database to also store said associated rules and dynamic layout information.

3. The system according to claim 2 and wherein said information comprises at least one of: said anchor information, said anchor creation history, the original position and size of said components and designer and end-user parameters.

4. The system according to claim 2 and wherein said updates comprise the manipulation of said website components according to said event and said associated rules.

5. The system according to claim 1 and wherein said coordinator comprises a dynamic data aggregator to aggregate and limit dynamic data.

6. The system according to claim 1 and wherein said triggers comprise at least one of component size and position changes, content changes, content formatting change, components having multiple configurations, multiple target platforms, multiple screen sizes, dynamic data, end user changes and application initiated layout changes.

7. The system according to claim 1 and wherein said rules are at least one of: user defined and system defined.

8. The system according to claim 1 and wherein said website is viewable via at least one of: a regular browser, a specialized web browser and a non-browser client access application.

9. The system according to claim 1 and wherein said changes are changes in at least one of the content, layout and attributes of said one or more component.

10. The system according to claim 1 and wherein two of said one or more components overlap or intersect each other.

11. A system for dynamically adjusting the layout of components of a shared website in a website building system according to changes in one or more of the components, the system comprising:

a memory and a processor;

an online website editor to enable a user to change said components within said website during an editing session;

a layout manager integrated into said website editor and operative during an editing session to dynamically create at least automatic anchors between parallel edges of affecting and affected components according to associated dynamic layout rules, said rules defining relationships at least between content and a containing component, between a component and a peer component in a primary direction, between bottom edges of said affecting and said affected components, and between top edges of said affecting and said affected components;

a receiver on a server to receive events caused by dynamic layout triggers generated by said online editor related to dynamic changes in at least position, size, content and visual attributes of at least one of said website components, said triggers generated in response to said changes received from at least two clients editing said shared website; and a database communicating with said server to store visual components of said shared website, rules and dynamic layout information changed in response to said events, said changes generated by said automatic anchors between at least two components of said website affected by said dynamic layout triggers, wherein each said component is an atomic component or a container component containing one or more other components.

12. The system according to claim 11 and wherein said information comprises at least one of: said anchor information, said anchor creation history, the original position and size of said components and designer and end-user parameters.

13. The system according to claim 11 and wherein said triggers comprise at least one of component size and position changes, content changes, content formatting change, components having multiple configurations, multiple target platforms, multiple screen sizes, dynamic data, end user changes and application initiated layout changes.

14. The system according to claim 11 and wherein said at least two clients are at least one of an editor client and a viewer client.

15. The system according to claim 11 and wherein said rules are at least one of: user defined and system defined.

16. The system according to claim 11 and wherein said shared website is viewable via at least one of: a regular browser, a specialized web browser and a non-browser client access application.

17. A system for dynamically adjusting the layout of components of a website in a website building system according to changes in one or more of the components, the system comprising:

a memory and a processor;

a client editor of an online website editor to enable a user to change said components within said website during an editing session, said client editor on a client;

a layout manager integrated into said website editor to dynamically create at least automatic anchors between parallel edges of affecting and affected components according to associated dynamic layout rules, said rules defining relationships at least between content and a containing component, between a component and a peer component in a primary direction, between bottom edges of said affecting and said affected components, and between top edges of said affecting and said affected components;

a coordinator on said client to receive events caused by dynamic layout triggers generated by said editor related to dynamic changes in at least position, size, content and visual attributes of at least one of said website components; and an updater on said client communicating with a database implemented on a server, said database storing visual components of said website, rules and dynamic layout information changed in response to said events, said changes generated by said automatic anchors, to update at least one of said website components according to said events and associated rules, wherein each said component is an atomic component or a container component containing one or more other components.

18. The system according to claim 17 and wherein said coordinator comprises a dynamic data aggregator to aggregate and limit dynamic data.

19. The system according to claim 17 and wherein said information comprises at least one of: anchor information, anchor creation history, the original position and size of said components and designer and end-user parameters.

20. The system according to claim 17 and wherein said updates comprise the manipulation of said website components according to said event and said associated rules.

21. The system according to claim 17 wherein said website components are at least one of a component and a framework.

22. The system according to claim 17 and wherein said triggers comprise at least one of component size and position changes, content changes, content formatting change, components having multiple configurations, multiple target platforms, multiple screen sizes, dynamic data, end user changes and application initiated layout changes.

23. The system according to claim 17 and wherein said rules are at least one of: user defined and system defined.

24. The system according to claim 17 and wherein said website is viewable via at least one of: a regular browser, a specialized web browser and a non-browser client access application.

25. A method for dynamically adjusting the layout of components of a website in a website building system according to changes in one or more of the components, the method comprising:
   storing visual components of said website in a database, wherein said components comprise atomic components and container components containing one or more other components;
   enabling a user, in a client of an online website editor, to change said components within said website during an online editing session;
   dynamically creating at least automatic anchors between parallel edges of components being changed in said editor and of components being affected by said components being changed, according to associated dynamic layout rules, said rules defining relationships at least between content and a containing component, between a component and a peer component in a primary direction, between bottom edges of said affecting and said affected components, and between top edges of said affecting and said affected components;
   receiving events caused by dynamic layout triggers generated by said online editor related to dynamic changes in at least position, size, content and visual attributes of at least one of said website components;
   in response to said events, automatically creating or removing anchors between at least two components of said website affected by said dynamic layout triggers to generate dynamic layout updates for said components according to associated dynamic layout rules;
   coordinating said dynamic layout updates to said website between a server and said at least one client according to said events and associated dynamic layout rules stored on said server; and
   displaying said components with said dynamic layout updates in said online editor, wherein each said component is an atomic component or a container component containing one or more other components.

26. The method according to claim 25 and also storing said associated rules and dynamic layout information.

27. The method according to claim 26 and wherein said information comprises at least one of: anchor information, anchor creation history, the original position and size of said components and designer and end-user parameters.

28. The method according to claim 26 and also comprising manipulating said website components according to said events and said associated rules.

29. The method according to claim 25 and wherein said coordinating comprises aggregating dynamic data and limiting dynamic data.

30. The method according to claim 25 and wherein said triggers comprise at least one of component size and position changes, content changes, content formatting change, components having multiple configurations, multiple target platforms, multiple screen sizes, dynamic data, end user changes and application initiated layout changes.

31. The method according to claim 25 and wherein said rules are at least one of: user defined and system defined.

32. The method according to claim 25 and wherein said website is viewable via at least one of: a regular browser, a specialized web browser and a non-browser client access application.

33. A method for dynamically adjusting the layout of components of a shared website in a website building system according to changes in one or more of the components, the method comprising:
   enabling a user to change said components within said website during an editing session of an online website editor;
   dynamically creating at least automatic anchors between parallel edges of affecting and affected components according to associated dynamic layout rules, said rules defining relationships at least between content and a containing component, between a component and a peer component in a primary direction, between bottom edges of said affecting and said affected components, and between top edges of said affecting and said affected components;
   receiving events caused by dynamic layout triggers generated by said online editor related to dynamic changes in at least position, size, content and visual attributes of at least one of said website components, said triggers generated in response to said changes received from at least two clients editing said shared website; and
   communicating with a database implemented on said server, said database storing visual components of said shared website, rules and dynamic layout information changed in response to said events, said changes generated by anchors between at least two components of said website affected by said dynamic layout triggers;
   wherein each said component is an atomic component or a container component containing one or more other components.

34. The method according to claim 33 and wherein said information comprises at least one of: anchor information, anchor creation history, the original position and size of said components and designer and end-user parameters.

35. The method according to claim 33 and wherein said triggers comprise at least one of component size and position changes, content changes, content formatting change, components having multiple configurations, multiple target platforms, multiple screen sizes, dynamic data, end user changes and application initiated layout changes.

36. The method according to claim 33 and wherein said at least two clients are at least one of an editor client and a viewer client.

37. The method according to claim 33 and wherein said rules are at least one of: user defined and system defined.

38. The method according to claim 33 and wherein said shared website is viewable via at least one of: a regular browser, a specialized web browser and a non-browser client access application.

\* \* \* \* \*